United States Patent
Miller

(10) Patent No.: US 11,416,012 B2
(45) Date of Patent: *Aug. 16, 2022

(54) METHODS AND SYSTEMS FOR INLINE MIXING OF HYDROCARBON LIQUIDS

(71) Applicant: MARATHON PETROLEUM COMPANY LP, Findlay, OH (US)

(72) Inventor: Kyle E. Miller, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/480,411

(22) Filed: Sep. 21, 2021

(65) Prior Publication Data
US 2022/0004210 A1    Jan. 6, 2022

Related U.S. Application Data

(60) Division of application No. 17/226,610, filed on Apr. 9, 2021, now Pat. No. 11,132,008, which is a (Continued)

(51) Int. Cl.
*F17D 3/00*    (2006.01)
*G05D 11/13*    (2006.01)
(Continued)

(52) U.S. Cl.
CPC .......... *G05D 11/132* (2013.01); *B01F 23/405* (2022.01); *B01F 25/43* (2022.01);
(Continued)

(58) Field of Classification Search
CPC ..... G05D 11/132; B01F 23/49; B01F 35/833; B01F 35/2111; Y10T 137/0329; Y10T 137/0352
See application file for complete search history.

(56) References Cited

U.S. PATENT DOCUMENTS 3,504,686 A *  4/1970  Ford .................. B01F 23/49
                                                137/593
3,608,869 A   9/1971  Woodle
(Continued)

FOREIGN PATENT DOCUMENTS

AU    2010241217    11/2010
AU    2013202839    5/2014
(Continued)

OTHER PUBLICATIONS

Information Disclosure Declaration by Kyle E. Miller, Dec. 18, 2020.

*Primary Examiner* — Reinaldo Sanchez-Medina
(74) *Attorney, Agent, or Firm* — Womble Bond Dickinson (US) LLP

(57) ABSTRACT

Embodiments include systems and methods of in-line mixing of hydrocarbon liquids from a plurality of tanks into a single pipeline. According to an embodiment, a method of admixing hydrocarbon liquids from a plurality of tanks into a single pipeline to provide in-line mixing thereof includes determining a ratio of a second fluid flow to a first fluid flow based on signals received from a tank flow meter in fluid communication with the second fluid flow and a booster flow meter in fluid communication with a blended fluid flow. The blended fluid flow includes a blended flow of the first fluid flow and the second fluid flow. The method further includes comparing the determined ratio to a pre-selected set point ratio thereby to determine a modified flow of the second fluid flow to drive the ratio toward the pre-selected set point ratio. The method further includes controlling a variable speed drive connected to a pump thereby to control the second fluid flow through the pump based on the determined modified flow, the pump being in fluid communication with the second fluid flow.

30 Claims, 16 Drawing Sheets

Related U.S. Application Data continuation of application No. 17/247,704, filed on Dec. 21, 2020, now Pat. No. 10,990,114.

(60) Provisional application No. 62/954,960, filed on Dec. 30, 2019, provisional application No. 62/705,538, filed on Jul. 2, 2020, provisional application No. 63/198,356, filed on Oct. 13, 2020.

(51) Int. Cl.
| | | |
|---|---|---|
| *C10G 71/00* | (2006.01) | |
| *G05B 19/042* | (2006.01) | |
| *B01F 23/40* | (2022.01) | |
| *B01F 25/43* | (2022.01) | |
| *B01F 35/82* | (2022.01) | |
| *B01F 35/21* | (2022.01) | |
| *B01F 35/83* | (2022.01) | |
| *B01F 35/22* | (2022.01) | |

(52) U.S. Cl.
CPC ........ *B01F 35/211* (2022.01); *B01F 35/2134* (2022.01); *B01F 35/2202* (2022.01); *B01F 35/2206* (2022.01); *B01F 35/82* (2022.01); *B01F 35/833* (2022.01); *B01F 35/8311* (2022.01); *C10G 71/00* (2013.01); *F17D 3/00* (2013.01); *G05B 19/042* (2013.01); *G05D 11/137* (2013.01); *C10G 2300/308* (2013.01); *G05B 2219/24215* (2013.01); *G05B 2219/25266* (2013.01)

(56) References Cited

U.S. PATENT DOCUMENTS

| | | | |
|---|---|---|---|
| 4,420,008 | A | 12/1983 | Shu |
| 4,788,093 | A | 11/1988 | Murata et al. |
| 4,964,732 | A | 10/1990 | Cadeo et al. |
| 5,191,537 | A | 3/1993 | Edge |
| 5,895,347 | A | 4/1999 | Doyle |
| 5,906,877 | A | 5/1999 | Popper et al. |
| 5,939,166 | A | 8/1999 | Cheng et al. |
| 5,993,054 | A | 11/1999 | Tan et al. |
| 6,065,903 | A | 5/2000 | Doyle |
| 6,077,340 | A | 6/2000 | Doyle |
| 6,111,021 | A | 8/2000 | Nakahama et al. |
| 6,149,351 | A | 11/2000 | Doyle |
| 6,186,193 | B1 | 2/2001 | Phallen et al. |
| 6,333,374 | B1 | 12/2001 | Chen |
| 6,346,813 | B1 | 2/2002 | Kleinberg |
| 6,679,302 | B1 | 1/2004 | Mattingly et al. |
| 6,799,883 | B1 | 10/2004 | Urquhart et al. |
| 7,032,629 | B1 | 4/2006 | Mattingly et al. |
| 7,631,671 | B2 | 12/2009 | Mattingly et al. |
| 8,414,781 | B2 | 4/2013 | Berard |
| 8,597,380 | B2 | 12/2013 | Buchanan |
| 8,748,677 | B2 | 6/2014 | Buchanan |
| 9,162,944 | B2 | 10/2015 | Bennett et al. |
| 9,388,350 | B2 | 7/2016 | Buchanan |
| 10,501,385 | B1 | 12/2019 | Buckner et al. |
| 10,990,114 | B1 | 4/2021 | Miller |
| 2003/0178994 | A1 | 9/2003 | Hurlimann et al. |
| 2004/0125688 | A1* | 7/2004 | Kelley ................. G05D 11/132 366/152.2 |
| 2005/0154132 | A1 | 7/2005 | Hakuta et al. |
| 2005/0284333 | A1 | 12/2005 | Falkiewicz |
| 2008/0113884 | A1 | 5/2008 | Campbell et al. |
| 2009/0107111 | A1 | 4/2009 | Oliver |
| 2009/0175738 | A1 | 7/2009 | Shaimi |
| 2009/0188565 | A1 | 7/2009 | Satake |
| 2010/0031825 | A1* | 2/2010 | Kemp ..................... B01F 23/49 366/152.2 |
| 2012/0276379 | A1 | 11/2012 | Daniels et al. |
| 2013/0062258 | A1 | 3/2013 | Ophus |
| 2013/0293884 | A1 | 11/2013 | Lee et al. |
| 2014/0121622 | A1 | 5/2014 | Jackson et al. |
| 2014/0158616 | A1 | 6/2014 | Govind et al. |
| 2014/0158632 | A1 | 6/2014 | Govind et al. |
| 2014/0171538 | A1 | 6/2014 | Daniels et al. |
| 2014/0356707 | A1 | 12/2014 | Kwon et al. |
| 2016/0169098 | A1 | 6/2016 | Makita |
| 2017/0131728 | A1 | 5/2017 | Lambert et al. |
| 2017/0248569 | A1 | 8/2017 | Lambert et al. |
| 2017/0253737 | A1 | 9/2017 | Auld et al. |
| 2017/0253738 | A1 | 9/2017 | Auld et al. |
| 2017/0253806 | A1 | 9/2017 | Auld et al. |
| 2017/0259229 | A1* | 9/2017 | Chou .................... B01F 35/881 |
| 2017/0306428 | A1 | 10/2017 | Helgason et al. |
| 2017/0367346 | A1 | 12/2017 | Rees et al. |
| 2018/0002617 | A1 | 1/2018 | Umansky et al. |
| 2018/0223202 | A1* | 8/2018 | Fransham ........... B01F 35/2209 |
| 2019/0016963 | A1 | 1/2019 | Auld et al. |
| 2019/0136060 | A1 | 5/2019 | Helgason et al. |
| 2019/0338203 | A1 | 11/2019 | Umansky et al. |
| 2019/0359899 | A1 | 11/2019 | Umansky et al. |
| 2019/0367732 | A1 | 12/2019 | Helgason et al. |
| 2021/0232163 | A1 | 7/2021 | Miller |

FOREIGN PATENT DOCUMENTS

| | | |
|---|---|---|
| CA | 2702151 | 10/2007 |
| CA | 2637421 | 1/2010 |
| CA | 2642295 | 1/2010 |
| CA | 2736733 | 10/2011 |
| CA | 2958443 | 4/2017 |
| CA | 2995532 | 4/2017 |
| CN | 2092562 U | 1/1992 |
| EP | 3076461 | 10/2016 |
| EP | 3285759 | 2/2018 |
| WO | 1996006685 | 5/1996 |
| WO | 1997006004 | 2/1997 |
| WO | 1997006298 | 2/1997 |
| WO | 1998003711 | 1/1998 |
| WO | 2002030551 | 4/2002 |
| WO | 2003003002 | 1/2003 |
| WO | 2004003293 | 1/2004 |
| WO | 2005018300 | 3/2005 |
| WO | 2007112335 | 10/2007 |
| WO | 2007149851 | 12/2007 |
| WO | 2009055024 | 4/2009 |
| WO | 2013112274 | 8/2013 |
| WO | 2014089443 | 6/2014 |
| WO | 2014173672 | 10/2014 |
| WO | 2015061868 | 5/2015 |
| WO | 2015153607 | 10/2015 |
| WO | 2016004107 | 1/2016 |
| WO | 2016146404 | 9/2016 |
| WO | 2017087731 | 5/2017 |
| WO | 2017152269 | 9/2017 |
| WO | 2018005141 | 1/2018 |
| WO | 2018102378 | 6/2018 |
| WO | 2020044026 | 3/2020 |
| WO | 2020118020 | 6/2020 |
| WO | 2020132632 | 6/2020 |
| ZA | 199606765 | 2/1998 |
| ZA | 200610366 | 1/2008 |

\* cited by examiner

METHODS AND SYSTEMS FOR INLINE MIXING OF HYDROCARBON LIQUIDS

CROSS-REFERENCE TO RELATED APPLICATIONS

This application is a divisional of U.S. Non-Provisional application Ser. No. 17/226,610, filed Apr. 9, 2021, titled "METHODS AND SYSTEMS FOR INLINE MIXING OF HYDROCARBON LIQUIDS," now U.S. Pat. No. 11,132, 008, issued Sep. 28, 2021, which is a continuation of U.S. Non-Provisional application Ser. No. 17/247,704, filed Dec. 21, 2020, titled "METHODS AND SYSTEMS FOR INLINE MIXING OF HYDROCARBON LIQUIDS," now U.S. Pat. No. 10,990,114, issued Apr. 27, 2021, which claims priority to, and the benefit of U.S. Provisional Application No. 62/954,960, filed Dec. 30, 2019, titled "METHOD AND APPARATUS FOR INLINE MIXING OF HEAVY CRUDE," U.S. Provisional 62/705,538, filed Jul. 2, 2020, titled "METHODS AND SYSTEMS FOR INLINE MIXING OF PETROLEUM LIQUIDS," and U.S. Provisional 63/198,356, filed Oct. 13, 2020, titled "METHODS AND SYSTEMS FOR INLINE MIXING OF PETROLEUM LIQUIDS," the disclosures of which are incorporated herein by reference in their entirety.

FIELD OF DISCLOSURE

The disclosure herein relates to systems and methods for providing in-line mixing of hydrocarbon liquids, and one or more embodiments of such systems and methods may be suitable for providing multi-component mixing of two or more hydrocarbon liquids.

BACKGROUND

Different types of hydrocarbon liquids, such as petroleum and renewable liquid products (e.g., such as crude oil), are often mixed upstream of a refinery to reduce the viscosity of heavy crude and maximize capacity, or to create a desired set of properties (TAN, sulfur, etc.). Given the multitude of crude types, the potential mixtures and component ratios are numerous. In some situations, multiple different types of hydrocarbon liquids, e.g., crude oil and renewable products, from different tanks may need to be mixed in a particular ratio. Further, there may also be a need to create a desired mixture on demand and ship the mixture through a pipeline as one homogenous product. In such examples, the mixing of different types of hydrocarbon liquid, e.g., crude and renewable liquid, may be performed at a pipeline origination station. Often, the pipeline origination station may include a tank farm (e.g., having multiple tanks for storage and mixing of the crude oils) and extensive piping capable of transporting hydrocarbon liquids from each of the tanks to one or more mainline booster pumps, which raise the hydrocarbon liquids to high pressures for traveling on a long pipeline.

Historically, crude mixing occurred by blending the crude oils in one or more tanks. Tank mixing is the most common form of crude mixing in the oil and gas industry. While relatively inexpensive, such methods have several undesirable drawbacks. For example, the extent and/or accuracy of the mixing may be less precise (e.g., having an error rate of +/− about 10% based on a target set point). Such methods typically require an entire tank to be dedicated to blending the crude oils along with separate distribution piping therefrom. In addition, the mixed crude product tends to stratify in the tank without the use of tank mixers, which also require additional capital investment. Further, the mixed crude product is generally limited to a 50/50 blend ratio.

An alternative to tank mixing is parallel mixing, which uses two pumps to pump two controlled feed streams (e.g., one pump per feed stream) on demand from separate tanks and into the pipeline. While parallel mixing is typically more precise than tank mixing, it is also more difficult to control because both streams are pumped by booster pumps into a common stream. Typically, the two pumped streams are individually controlled by variable speed pumps or pumps with flow control valves; therefore, the two sets of independent controls may interfere with each other and/or may have difficulty reaching steady state if not programmed correctly.

Applicant has recognized, however, that in parallel mixing operations, both streams need to be boosted to about 50-200 psi of pressure in the tank farm to provide adequate suction pressure to a mainline booster pump that is positioned downstream of the boosters. Even if one stream operates at a fixed flow while the other varies, the need to boost the pressure of each stream to about 50-200 psi may require high horsepower boost pumps dedicated to each line. Such dedicated pumps may be needed to supply streams at adequate pressure to the mainline pumps and may require significant capital investment. From a commercial standpoint, for example, parallel mixing operations require much more infrastructure, representing a 180% to 200% increase in cost difference compared to the in-line mixing systems disclosed herein. Therefore, there is a need in the industry for accurate and cost-effective blending methods and systems for crude and other hydrocarbon liquid products.

SUMMARY

The disclosure herein provides embodiments of systems and methods for in-line fluid mixing of hydrocarbon liquids. In particular, in one or more embodiments the disclosure provides in-line mixing systems that may be positioned at a tank farm, including a one or more tanks positioned to store one or more hydrocarbon liquids. Such an embodiment of an in-line mixing system is positioned to admix two or more of those hydrocarbon liquids contained within the plurality of tanks to provide a blended mixture within a single pipeline. In some embodiments, the systems and methods of the disclosure may provide for in-line mixing of at least two hydrocarbon liquids, at least three hydrocarbon liquids, or more to form a blended fluid flow in a single pipeline, e.g., which may be referred to herein as two-component blend, three-component blends, or a blend containing more than three hydrocarbon liquids.

In one or more embodiments, an in-line fluid mixing system may be positioned at a tank farm to admix hydrocarbon liquids from a plurality of tanks into a single pipeline. For example, a first tank may be positioned in a tank farm and may contain a first fluid therein. In some embodiments, the first tank may have a first output pipe connected to the first tank proximate a bottom portion thereof. The first output pipe may be in fluid communication with the first fluid to transport a flow of the first fluid from the first tank through the first output pipe at a first pressure. The system also may include a second tank positioned in the tank farm and containing a second fluid therein. The second tank may have a second output pipe connected to the second tank proximate a bottom portion thereof. The second output pipe may be in fluid communication with the second fluid to transport a flow of the second fluid from the second tank through the second output pipe at a second pressure.

In some embodiments of the disclosure, for example, the system may include a first pump having an inlet and an outlet, and the inlet of the pump may be connected to the second output pipe to increase pressure of the flow of the second fluid from the second pressure to a pump pressure at the outlet. Systems as disclosed herein, for example, may include a mixing booster pipe connected to the outlet of the pump to transport the flow of the second fluid therethrough. A system according to one or more embodiments of the disclosure may include a blended fluid pipe connected to and in fluid communication with the first output pipe and the mixing booster pipe to admix the flow of first fluid at the first pressure and the flow of second fluid at the second pressure into a blended fluid flow.

In one or more embodiments, for example, in-line mixing systems may include a tank flow meter connected to the mixing booster pipe and positioned between the pump and the blended fluid pipe to measure flow rate of the flow of the second fluid between the pump and the blended fluid pipe. Systems also may include a flow control valve connected to the mixing booster pipe between the tank flow meter and the blended fluid pipe to control the flow of the second fluid between the pump and the blended fluid pipe. In some embodiments, in-line mixing systems of the disclosure also may include a second pump having an inlet in fluid communication with the blended fluid pipe and an outlet. The second pump may have a greater horsepower than the first pump. A booster flow meter may be in fluid communication with the blended fluid pipe and positioned to measure total flow rate of the blended fluid flow transported through the blended fluid pipe. A pipeline also may be connected to the outlet of the booster pump to transport the blended fluid flow therethrough and external of the tank farm. The pipeline may be configured to transport the blended fluid across long distances at high pressures, for example, to other plants and industrial facilities.

In some embodiments, the first pressure may result from force of gravity on the first fluid contained in the first tank. In-line mixing systems may include one or more controllers in communication with the tank flow meter and the booster flow meter. In certain embodiments, for example, the one or more controllers may be configured to determine a ratio of the flow of second fluid to the flow of first fluid responsive to one or more signals received from the tank flow meter and the booster flow meter. Some embodiments of systems may include a variable speed drive connected to the first pump to control pump speed to thereby adjust the flow of the second fluid through the first pump. For example, embodiments of systems of the disclosure also may include a programmable logic controller in communication with the variable speed drive and configured to control the variable speed drive. The one or more controllers may be configured to compare the ratio to a pre-selected set point ratio, determine a modified flow of the second fluid to drive the ratio toward the pre-selected set point ratio, and send a control signal to the one or more controllers to adjust the variable speed drive based on the determined modified flow of the second fluid.

Other embodiments of the disclosure relate to methods of admixing hydrocarbon liquids from a plurality of tanks into a single pipeline to provide in-line mixing thereof. Some embodiments of methods, for example, may include determining a ratio of a second fluid flow to a first fluid flow based on signals received from a tank flow meter in fluid communication with the second fluid flow and a booster flow meter in fluid communication with a blended fluid flow. The blended fluid flow, for example, may include a blended flow of the first fluid flow and the second fluid flow. In some embodiments of the disclosure, a method also may include comparing the determined ratio to a pre-selected set point ratio thereby to determine a modified flow of the second fluid flow to drive the ratio toward the pre-selected set point ratio. In further embodiments, the method may include controlling a variable speed drive connected to a pump thereby to control the second fluid flow through the pump based on the determined modified flow, the pump being in fluid communication with the second fluid flow.

In some embodiments, methods as described herein may include maintaining the difference between the calculated ratio and the pre-selected set point ratio within a pre-selected error range. In some embodiments, for example, the pre-selected error range may be in the range of about 1.0% to −1.0%. In certain other embodiments, the pre-selected error range may be in the range of about 0.05% to about −0.05%. Methods according to the disclosure also may include adjusting a flow control valve in fluid communication with the second fluid flow to thereby control the second fluid flow based on the determined modified flow. In some embodiments, for example, methods may include adjusting a flow control valve in fluid communication with the second fluid flow to thereby maintain pressure at the tank flow meter between about 15 psi and about 25 psi.

In some embodiments, methods of admixing hydrocarbon liquids from a plurality of tanks into a single pipeline to provide in-line mixing thereof are described herein. The method may include permitting a first hydrocarbon fluid to flow from a first crude tank at a tank farm to a first output pipe. The first hydrocarbon fluid may have a first pressure in the first output pipe. The method may include pumping a second hydrocarbon fluid from a second crude tank at the tank farm to a second tank mixing booster pipe. The second hydrocarbon fluid may have a second pressure in the second tank mixing booster pipe. The method may include admixing the first hydrocarbon fluid from the first output pipe and the second hydrocarbon fluid from the second tank mixing booster pipe into a blended fluid pipe to create a blended fluid. The method may include determining a flow rate of the second hydrocarbon fluid in the second tank mixing booster pipe with a tank flow meter that measures flow rate in the second tank mixing booster pipe. The method may include determining a flow rate of the blended fluid in the blended fluid pipe with a booster flow meter that measures flow rate in the blended fluid pipe. The method may include determining a flow rate of the first hydrocarbon fluid in the first output pipe from the second hydrocarbon fluid flow rate and the blended fluid flow rate. The method may include comparing a ratio of the second hydrocarbon fluid flow rate and the first hydrocarbon fluid flow rate to a pre-selected set point ratio. The method may include controlling the second pressure of the second hydrocarbon fluid to modify the second flow rate and drive the ratio toward the pre-selected set point ratio. The method may include pumping the blended fluid through a downstream pipeline.

In another embodiment, a method of admixing hydrocarbon liquids from a plurality of tanks into a single pipeline to provide in-line mixing thereof is described herein. The method may include permitting a first hydrocarbon fluid to flow from a first crude tank at a tank farm to a first output pipe. The first hydrocarbon fluid may have a first pressure in the first output pipe. The method may include pumping a second hydrocarbon fluid from a second crude tank at the tank farm to a second tank mixing booster pipe. The second hydrocarbon fluid having a second pressure in the second tank mixing booster pipe. The method may include pumping a third hydrocarbon fluid from a third crude tank at the tank farm to a third tank mixing booster pipe. The third hydrocarbon fluid having a third pressure in the third tank mixing booster pipe. The method may include admixing the first hydrocarbon fluid from the first output pipe, the second hydrocarbon fluid from the second tank mixing booster pipe, and the third hydrocarbon fluid from the third tank mixing booster pipe into a blended fluid pipe to create a blended fluid. The method may include determining a flow rate of the second hydrocarbon fluid in the second tank mixing booster pipe with a second tank flow meter that measures flow rate in the second tank mixing booster pipe. The method may include determining a flow rate of the third hydrocarbon fluid in the third tank mixing booster pipe with a third tank flow meter that measures flow rate in the third tank mixing booster pipe. The method may include determining a flow rate of the blended fluid in the blended fluid pipe with a booster flow meter that measures flow rate in the blended fluid pipe. The method may include determining a flow rate of the first hydrocarbon fluid in the first output pipe based on the second hydrocarbon fluid flow rate, the third hydrocarbon fluid flow rate and the blended fluid flow rate. The method may include comparing percentages of the first hydrocarbon fluid flow rate, second hydrocarbon fluid flow rate, and third hydrocarbon fluid flow rate in the blended fluid flow to pre-selected percentages. The method may include controlling at least one of the second pressure of the second hydrocarbon fluid or the third pressure of the third hydrocarbon fluid to modify flowrates of the second hydrocarbon fluid and the third hydrocarbon fluid and drive the percentages toward the pre-selected percentages. The method may include pumping the blended fluid through a downstream pipeline.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

DETAILED DESCRIPTION

Figure 1:
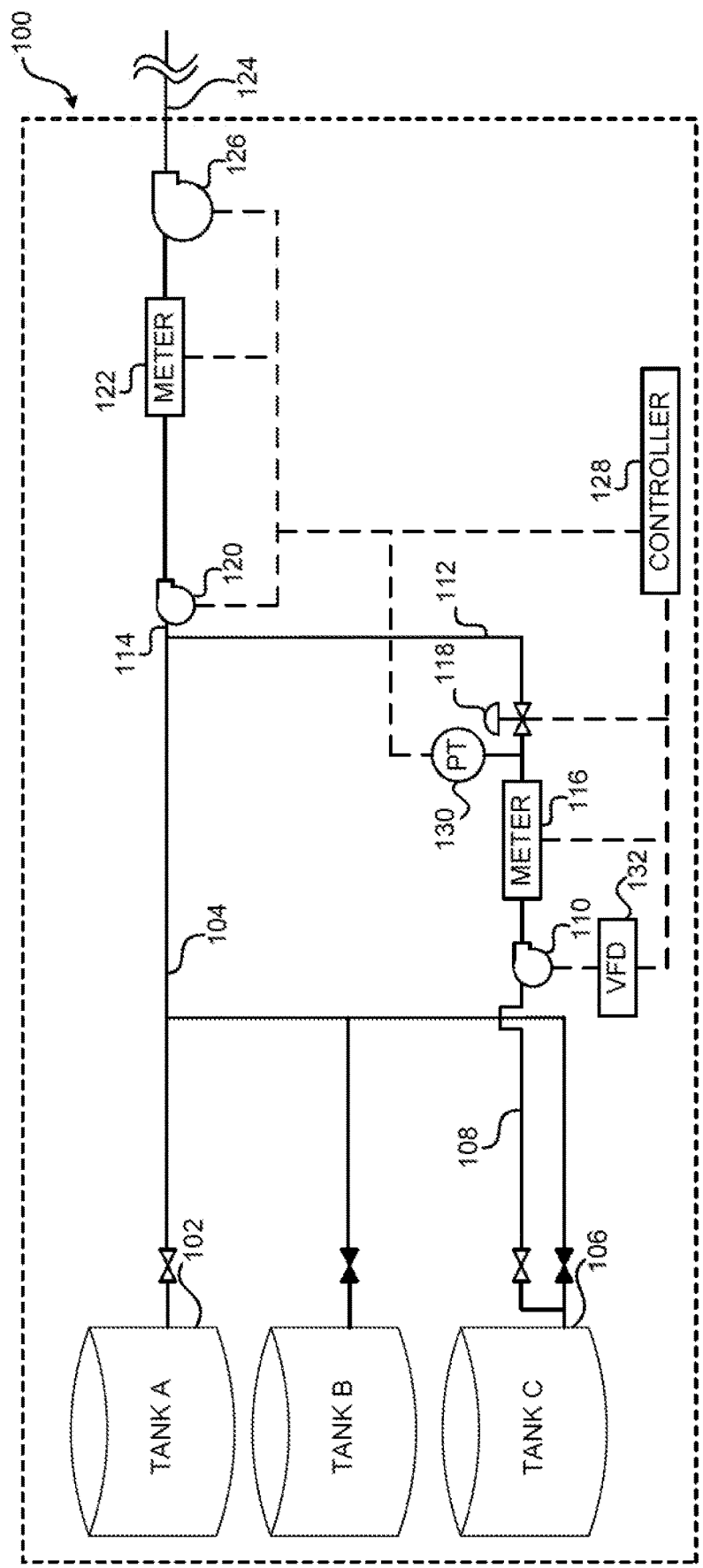
FIG. 1 is a schematic diagram of a two-component in-line mixing system positioned at a tank farm to admix two hydrocarbon liquids from separate tanks into a single pipeline according to an embodiment of the disclosure.

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

The present disclosure provides embodiments of systems and methods for in-line fluid mixing of hydrocarbon liquids. "Hydrocarbon liquids" as used herein, may refer to petroleum liquids, renewable liquids, and other hydrocarbon based liquids. "Petroleum liquids" as used herein, may refer to liquid products containing crude oil, petroleum products, and/or distillates or refinery intermediates. For example, crude oil contains a combination of hydrocarbons having different boiling points that exists as a viscous liquid in underground geological formations and at the surface. Petroleum products, for example, may be produced by processing crude oil and other liquids at petroleum refineries, by extracting liquid hydrocarbons at natural gas processing plants, and by producing finished petroleum products at industrial facilities. Refinery intermediates, for example, may refer to any refinery hydrocarbon that is not crude oil or a finished petroleum product (e.g., such as gasoline), including all refinery output from distillation (e.g., distillates or distillation fractions) or from other conversion units. In some non-limiting embodiments of systems and methods, petroleum liquids may include heavy blend crude oil used at a pipeline origination station. Heavy blend crude oil is typically characterized as having an American Petroleum Institute (API) gravity of about 30 degrees or below. However, in other embodiments, the petroleum liquids may include lighter blend crude oils, for example, having an API gravity of greater than 30 degrees. "Renewable liquids" as used herein, may refer to liquid products containing plant and/or animal derived feedstock. Further, the renewable liquids may be hydrocarbon based. For example, a renewable liquid may be a pyrolysis oil, oleaginous feedstock, biomass derived feedstock, or other liquids, as will be understood by those skilled in the art. The API gravity of renewable liquids may vary depending on the type of renewable liquid.

In particular, in one or more embodiments, the disclosure provides an in-line mixing system that may be positioned at a tank farm that includes a plurality of tanks configured to store one or more hydrocarbon liquids. Such an in-line mixing system may provide admixing of two or more of those hydrocarbon liquids contained within the plurality of tanks to provide a blended mixture within a single pipeline. In some embodiments, the systems and methods of the disclosure may provide for in-line mixing of at least two hydrocarbon liquids, at least three hydrocarbon liquids, or more than three hydrocarbon liquids to form a blended fluid flow in a single pipeline, e.g., which may be referred to herein as two-component blends, three-component blends, or a blend containing more than three hydrocarbon liquids. Advantageously, in-line mixing operations (sometimes referred to as "series mixing") may utilize one or more controlled, tank output streams (e.g., controlled via a low horsepower mixing booster pump and flow control valve) and a gravity-fed stream, all of which are upstream of a common booster pump used to pump a blended fluid stream through a pipeline. Further, the in-line mixing system may include sensors, disposed throughout the tank farm, to determine density or gravity, allowing for the in-line mixing system to blend the hydrocarbon liquids according to a target blend density or gravity, providing a precisely blended fluid or liquid stream.

In some embodiments, the systems and methods as described herein may provide for in-line, on-demand, blending of crude oil, other hydrocarbon liquids, and/or renewable liquids at a pipeline origination station. A pipeline origination station is typically located at or near a tank farm (e.g., having a plurality of tanks containing hydrocarbon liquids). The pipeline origination station includes extensive piping capable of transporting the hydrocarbon liquids from each of the nearby tanks in the tank farm to one or more mainline booster pumps, which raise the hydrocarbon liquids to very high pressures for passage through the long pipeline. A "tank farm" as used herein, refers to a plurality of tanks positioned in an area, each of the plurality of tanks configured to hold one or more hydrocarbon liquids therein. In some embodiments, the plurality of tanks may be positioned proximate to each other or the plurality of tanks may be spread out across a larger area. In some embodiments, the plurality of tanks may be positioned sequentially such that each tank is equally spaced apart. Generally, the number of individual tanks in a tank farm may vary based on the size of the pipeline origination station and/or based on the amount of hydrocarbon liquids being stored in that facility. For example, the tank farm may include at least 2, at least 4, at least 6, at least 8, at least 10, at least 12, or more individual tanks within the tank farm.

As noted above, typical pipeline origination stations require blending of two or more different hydrocarbon liquids in a blending tank prior to pumping the blended hydrocarbon liquids from the blending tank itself. However, the systems and methods of this disclosure advantageously provide in-line, on-demand mixing directly in a pipe in the tank farm prior to the blended liquid being pumped to the pipeline. Such pipe blending may eliminate stratification of mixed oil in tanks and does not require the use of individual tank mixers in each of the tanks. These systems and methods may also eliminate the need to mix the hydrocarbon liquids in one or more tanks before the hydrocarbon liquids are pumped therefrom, which advantageously allows for the changing of the blend on-demand and on-demand blending during operation of the pipeline origination station. In some embodiments, for example, a separate blending tank in the tank farm is not necessary, and thus, one or more tanks in the tank farm previously used for blending may beneficially be used for storage of additional hydrocarbon liquids, which may also be blended in-line. Further, basing blending operations on gravity measurements may increase accuracy and precision of blending. While a blending operation constantly or continuously checking gravity and adjusting may produce a less accurate blend, due to the lagging nature of gravity adjustments versus flow rate, checking the gravity and adjusting flow rates at specified time intervals (for example, 10 to 20 minute intervals) may allow for an accurate and precise blend. Further, adjusting while continuing a blending operation or process ensures an accurate and precise blend, as well as a blend produced in the same amount of time as a typical blending operation. Further still, such gravity measuring and adjusting systems may include little additional equipment (e.g., flow meters included in the tank farm may be Coriolis meters or density or gravity sensors may be added near the meter or to a pipe or tank).

Other typical pipeline origination stations may use parallel mixing of two or more hydrocarbon liquids, which may be expensive and of lower efficiency. In particular, typical parallel mixing operations require a dedicated high horsepower mixing booster pump (e.g., greater than 750 hp, greater than 850 hp, greater than 950 hp or even greater than 1050 hp) for each of the mixing streams and an additional static mixer to blend the hydrocarbon liquids pumped through each of the mixing streams. However, the systems and methods of this disclosure advantageously provide cost and energy savings, because such systems and methods do not require high horsepower mixing booster pumps or the additional static mixer. For example, the mixing booster pumps typically used in the mixing streams of the systems and methods described herein typically have lower horsepower ratings (e.g., less than 250 hp, less than 200 hp, less than 150 hp, or even less than 100 hp). In addition, the in-line mixing systems, according to this disclosure, may eliminate the need for two or more variable speed pumps and/or control valves (i.e., one for each of the streams), because as further disclosed herein, one stream may be gravity-fed from the tank and thus controls itself in physical response to the other controlled, tank output stream(s). Further, in-line mixing systems as described herein may provide for more accurate control of blended hydrocarbon liquids, for example, within 1.0 percent or less of the desired set point (e.g., desired flow rate and/or density or gravity) for the blended fluid flow.

FIG. 1 depicts a process diagram of a non-limiting, two-component in-line mixing system according to one or more embodiments of the disclosure. In particular, FIG. 1 illustrates a two component in-line mixing system 100 positioned at a tank farm (e.g., as depicted by the dashed rectangular box in FIG. 1) to admix two hydrocarbon liquids from separate tanks into a single pipeline to provide a two-component blended fluid flow. As shown in FIG. 1, the two-component in-line mixing system includes a first tank 102 (e.g., tank A) positioned in a tank farm and containing a first fluid therein. Generally, the first fluid includes one or more hydrocarbon liquids, of a first density or gravity, as defined herein above and as would be understood by a person of skill in the art. In some embodiments, the first tank 102 may have a first output pipe 104 connected to the first tank 102 proximate a bottom portion thereof and the first output pipe 104 may be in fluid communication with the first fluid to transport a flow of the first fluid from the first tank 102 through the first output pipe 104 at a first pressure. In some embodiments, the first pressure may be in the range of about 0.1 pound per square inch (psi) to about 100 psi, about 0.5 psi to about 50 psi, or about 1 psi to about 10 psi. In some embodiments, the first pressure may be less than about 20 psi, less than about 10 psi, less than about 5 psi, or less than about 1 psi. In some embodiments, the first pressure results from force of gravity on the first fluid contained in the first tank. For example, gravity rather than a pump transports the flow of the first fluid from the first tank and through the first outlet pipe. An outlet pipe having a pressure that results from force of gravity, and not by a pump, may be referred to herein as a "gravity-fed" line.

In one or more embodiments, the two-component in-line mixing system may include a second tank 106 (e.g., tank C) positioned in the tank farm and containing a second fluid therein. Generally, the second fluid includes one or more hydrocarbon liquids, of a second density or gravity, as defined herein above and as would be understood by a person of skill in the art. In some embodiments, the second tank 106 may have a second output pipe 108 connected to the second tank 106 proximate a bottom portion thereof and the second output pipe 108 may be in fluid communication with the second fluid to transport a flow of the second fluid from the second tank 106 through the second output pipe 108 at a second pressure. In some embodiments, the second pressure may be in the range of about 0.1 pound per square inch (psi) to about 100 psi, about 0.5 psi to about 50 psi, or about 1 psi to about 10 psi. In some embodiments, the second pressure may be less than about 20 psi, less than about 10 psi, less than about 5 psi, or less than about 1 psi. Similar to the first pressure, the second pressure also results from force of gravity on the second fluid contained in the second tank. For example, gravity rather than a pump transports the flow of the second fluid from the second tank and through the second outlet pipe.

In one or more embodiments, two-component in-line mixing systems as described herein may include a first pump 110 having an inlet and an outlet. For example, the inlet of the first pump 110 may be connected to the second output pipe 108 to increase pressure of the flow of the second fluid from the second pressure to a pump pressure at the outlet. In some embodiments, the pump pressure at the outlet of the first pump may be in the range of about 1 psi to about 100 psi, about 10 psi to about 50 psi, or about 25 psi to about 35 psi. In some embodiments, the pump pressure at the outlet of the first pump may be at least about 10 psi, at least about 20 psi, at least about 30 psi, at least about 40 psi, at least about 50 psi, or higher. Further, this first pump 110 may have a horsepower between 1 hp and 500 hp, between 50 and 250 hp or between 125 hp and 175 hp. In such embodiments, the first pump 110 may have a horsepower of 500 hp or less, 400 hp or less, 300 hp or less, 200 hp or less, 100 hp or less, and lower. Generally, the pump pressure at the outlet of the first pump is greater than the second pressure in the second output pipe. In some embodiments, in-line mixing systems as described herein may include a variable speed drive (VFD) 132 connected to the first pump 110 to control pump speed to thereby adjust the flow of the second fluid through the first pump. Generally, variable speed drives, which may also be referred to as adjustable speed drives, are devices that may vary the speed of a normally fixed speed motor and/or pump based on feedback from one or more control components. The specific type of variable speed drive may vary as would be understood by a person of skill in the art.

As depicted in FIG. 1, in some embodiments, two-component in-line mixing systems as described herein may include a mixing booster pipe 112 connected to the outlet of the first pump 110 to transport the flow of the second fluid therethrough. In some embodiments, a blended fluid pipe 114 may be connected to and in fluid communication with the first output pipe 104 and the mixing booster pipe 112 to admix the flow of first fluid at the first pressure and the flow of second fluid into a blended fluid flow. In one or more embodiments, the pump pressure of the second fluid may be about equal to pressure of the first fluid at the portion of the blended fluid pipe 114 configured to admix the flow of first fluid and the flow of second fluid into a blended fluid flow. In some embodiments, a tank flow meter 116 may be connected to the mixing booster pipe 112 and positioned between the first pump 110 and the blended fluid pipe 114 to measure flow rate of the flow of the second fluid between the first pump 110 and the blended fluid pipe 114. The tank flow meter 116 may be a turbine flow meter or another type of flow meter as would be known to those skilled in the art. Generally, the tank flow meter may provide flow readings in the form of barrels per hour of hydrocarbon liquids. In another embodiment the tank flow meter 116 may include a sensor or functionality to measure a density or gravity of the liquid (e.g., a mass flow meter or other meter as will be understood by those skilled in the art). In certain embodiments, a flow control valve 118 may also be connected to the mixing booster pipe 112 between the tank flow meter 116 and the blended fluid pipe 114 to control flow of the second fluid between the first pump 110 and the blended fluid pipe 114. In some embodiments, a pressure sensor/transducer 130 may also be connected to the mixing booster pipe 112 and positioned upstream of the flow control valve 118. In some embodiments, for example, the pressure sensor/transducer 130 may be connected to the mixing booster pipe 112 proximate the tank flow meter 116. The pressure sensor/transducer 130 may be configured to measure the back pressure at the flow control valve. Any type of pressure sensor/transducer may be used to measure the back pressure at the flow control valve as would be understood by a person of skill in the art.

In one or more embodiments, two-component in-line mixing systems as described herein may include a second pump 120 having an inlet in fluid communication with the blended fluid pipe 114 and an outlet. Generally, the second pump 120 will have a greater horsepower than the first pump 110 and thus, the pump pressure at the outlet of the second pump may be greater than the pump pressure at the outlet of the first pump as noted above. In some embodiments, for example, the pump pressure at the outlet of the second pump may be in the range of about 50 psi to about 500 psi, about 100 psi to about 300 psi, or about 150 psi to about 200 psi. In some embodiments, the pump pressure at the outlet of the second pump may be at least about 50 psi, at least about 100 psi, at least about 150 psi, at least about 200 psi, or higher. Further, this second pump 120 may have a horsepower between 250 hp and 2,500 hp, between 500 and 2,000 hp or between 750 hp and 1,500 hp. In such embodiments, the second pump 120 may have a horsepower of as much as 250 hp, 500 hp, 750 hp, 1,000 hp, 1,250 hp, 1,500 hp or more. The second pump 120 is positioned relative to the first pump 110 and the first tank 102 such that the pressure in the blended fluid pipe 114 at the inlet or suction of the second pump 120 is sufficiently high to preclude cavitation within the second pump 120. Generally, the pump pressure at the outlet of the second pump 120 is considerably higher than the pressure at the outlet of the first pump 110 to ramp up the pressure of the blended fluid flow prior to transfer to the pipeline.

In some embodiments, two-component in-line mixing systems as described herein may include a booster flow meter 122 in fluid communication with the blended fluid pipe 114 to measure total flow rate of the blended fluid flow transported through the blended fluid pipe 114. The booster flow meter 122 may be a turbine flow meter or another type of flow meter as would be known to those skilled in the art. Generally, the booster flow meter 122 may provide flow readings in the form of barrels per hour of hydrocarbon liquids. In another embodiment the booster flow meter 122 may include a sensor or functionality to measure a density or gravity of the blended fluid or liquid (e.g., a mass flow meter or other meter as will be understood by those skilled in the art). In some embodiments, the in-line mixing systems as described herein may include a pipeline 124 connected to the outlet of the second pump 120 to transport the blended fluid flow therethrough and away from the tank farm, e.g., to a pipeline origination station. In one or more embodiments, the in-line mixing systems described herein and shown in FIG. 1, may optionally include a third pump 126 positioned between the outlet of the second pump 120 and the pipeline 124. The third pump 126 is thus arranged to be in fluid communication with the outlet of the second pump 120, the booster flow meter 122, and the pipeline 124. Generally, the third pump 126 will have a greater horsepower and a greater outlet pump pressure than either of the first pump 110 and the second pump 120 in order to transport the blended fluid flow at much higher pressures through the pipeline 124. Such higher pressures are generally required for pumping the blended fluid flow along long pipelines before reaching a final destination. For example, such pipelines may be in excess of hundreds of miles in length. In some embodiments, the pump pressure at the outlet of the optional third pump may be in the range of about 100 psi to about 10,000 psi, about 500 psi to about 5,000 psi, or about 1,000 psi to about 2,000 psi. In some embodiments, the pump pressure at the outlet of the third pump 126 may be at least about 500 psi, at least about 1,000 psi, at least about 1,500 psi, or higher. Further, this third pump 126 may have a horsepower between 1,000 hp and 5,000 hp, between 2,000 and 4,500 hp or between 3,000 hp and 4,000 hp. In such embodiments, the third pump 126 may have a horsepower of as much as 2,500 hp, 3,000 hp, 3,500 hp, 4,500 hp, 5,000 hp or more. While the third pump 126 is shown in FIG. 1 as being within the tank farm (e.g. as depicted by the dashed rectangular box in FIG. 1), the third pump 126 (and start of the pipeline 124) may be located a distance apart from the tank farm, e.g., less than one mile, less than two or less than three miles. However, the third pump 126 is positioned relative to the second pump 120 such that the pressure at the inlet or suction of the third pump 126 is sufficiently high to preclude cavitation within the third pump 126.

In one or more embodiments, in-line mixing systems as described herein may include one or more controllers 128 in communication with the tank flow meter 116, the booster flow meter 122, the pressure sensor/transducer 130, and the variable speed drive (VFD) 132. Generally, the one or more controllers 128 may perform a variety of functions (e.g., determining mix ratios, flow rates, various densities, various gravities, corrected mix ratios, and/or controlling one or more functions of various components within the in-line mixing system 100). In some embodiments, the one or more controllers 128 may be configured to determine a ratio of the flow of second fluid to the flow of first fluid responsive to one or more signals received from the tank flow meter 116 and the booster flow meter 122. For example, the booster flow meter 122 may be configured to measure a total flow rate of the blended fluid flow therethrough and the tank flow meter 116 may be configured to measure the flow rate of the flow of the second fluid therethrough, such that the difference in the total flow rate of the blended fluid flow and the flow rate of the flow of the second fluid is approximately equal to the flow rate of the flow of the first fluid (e.g., which is gravity-fed). In some embodiments, both of the tank flow meter 116 and the booster flow meter 122 may provide flow readings in units of barrels per hour of hydrocarbon liquids. For example, if the booster flow meter 122 indicates that the blended flow has a flow rate of 10,000 barrels per hour and the tank flow meter 116 indicates that the flow rate of the flow of the second fluid is 4,000 barrels per hour, then the calculated flow rate of the flow of the first liquid is 6,000 barrels per hour (e.g., providing a mix ratio in the blended flow of approximately 40:60 (second fluid: first fluid)). In some embodiments, the one or more controllers 128 may be in communication with each of the tank flow meter 116 and the booster flow meter 122 to determine flow rate of the first fluid from the first tank 102 responsive to signals received from the tank flow meter 116 and the booster flow meter 122. In some embodiments, the tank flow meter 116 and booster flow meter 122 may include other sensors or functionality to provide a density or gravity of the second fluid (as well as the first fluid, in another example). If provided as a gravity, the tank flow meter 116 and booster flow meter 122 may indicate the gravity as a specific gravity. The one or more controllers 128 may further determine a density or gravity of the first fluid, based on the densities or gravities of the second fluid and blended fluid. Further, the controller 128 may adjust the flow rate of second flow, based on the densities or gravities of the first fluid, the second fluid, and the blended fluid and the target blend density or gravity.

In such embodiments, the ratio of the flow of the second fluid to the flow of the first fluid may be referred to herein as the mix ratio of the blended fluid flow. In some embodiments, the mix ratio may be varied in the range of about 1:99 (second fluid: first fluid) to about 99:1 (second fluid: first fluid). For example, in some embodiments, the blended fluid flow may include the flow of the second fluid in an amount of at least 5 percent, at least 10 percent, at least 15 percent, at least 20 percent, at least 25 percent, at least 30 percent, at least 35 percent, at least 40 percent, at least 45 percent, at least 50 percent, at least 55 percent, at least 60 percent, at least 65 percent, at least 70 percent, at least 75 percent, at least 80 percent, at least 85 percent, at least 90 percent, at least 95 percent, or more. In some embodiments, the blended fluid flow may include the flow of the first fluid in an amount of at least 5 percent, at least 10 percent, at least 15 percent, at least 20 percent, at least 25 percent, at least 30 percent, at least 35 percent, at least 40 percent, at least 45 percent, at least 50 percent, at least 55 percent, at least 60 percent, at least 65 percent, at least 70 percent, at least 75 percent, at least 80 percent, at least 85 percent, at least 90 percent, at least 95 percent, or more.

As noted above, the mix ratio (also referred to as the blend ratio) generally refers to the ratio of the second fluid to the first fluid in the total blended fluid flow. For example, a hypothetical blended fluid flow having a total flow rate of 10,000 barrels per hour with a mix ratio of 60:40 (second fluid: first fluid) would equate to a second fluid flow rate of 6,000 barrels per hour and a first fluid flow rate of 4,000 barrels per hour. Thus, the actual mix ratio may be constantly calculated during operation of the in-line mixing system based on measurement of the individual flow rates of the flow of the second fluid and the flow of the first fluid. It should be noted that the actual mix ratio will inherently fluctuate above and below a set point in a controlled system (e.g., such as in-line mixing systems 100 as described herein) based on control adjustments being made on-demand, in real-time. In addition, the amount of fluctuation in the actual mix ratio (e.g., the variance in the mix ratio) may be higher at the beginning of a blending operation run (e.g., operation for 30 minutes or less, 20 minutes or less, 10 minutes or less, or 5 minutes or less after a new set point mix ratio is input into the system) relative to a later time in the same blending operation run when steady state control has been achieved (e.g., operation for 30 minutes or longer, 1 hour or longer, 2 hours or longer, 4 hours or longer, 8 hours or longer, 12 hours or longer, or 24 hours or longer after a new set point mix ratio is input into the system). Generally, longer blending operation runs may provide better accuracy because steady state is reached within the in-line mixing system and this steady state is maintained for a longer period of time. Advantageously, the systems and methods of in-line mixing as described herein provide far more accurate control of the mix ratio (both at the beginning of a blending operation run and for the duration of the blending operation run) than typically provided with other blending methods commonly used in the art. In-line mixing systems 100 according to the disclosure may maintain the mix ratio within about +/−1.0 percent of the desired/pre-selected set point mix ratio. In certain embodiments, in-line mixing systems according to the disclosure may maintain the mix ratio within about +/−1.0 percent, about +/−0.5 percent, about +/−0.25 percent, about +/−0.1 percent, or about +/−0.05 percent of the desired/pre-selected set point mix ratio.

In one or more embodiments, the one or more controllers 128 may include a programmable logic controller. The one or more controllers 128 may be in communication with the variable speed drive 132, which may be connected to the first pump 110, and configured to control the variable speed drive 132. In such embodiments, the one or more controllers 128 may be configured to compare the mix ratio to a pre-selected set point ratio and to determine a modified flow of the second fluid, if necessary, to bring the mix ratio closer to the pre-selected set point ratio. For example, the one or more controllers 128 may be configured to send a control signal to the variable speed drive 132 to control the pump speed and thereby adjust the flow of the second fluid in order to drive the mix ratio toward the pre-selected set point ratio. If the mix ratio is lower than the pre-selected set point ratio, then the flow of the second fluid may be increased to drive the mix ratio toward the pre-selected set point ratio. Likewise, if the mix ratio is higher than the pre-selected set point ratio, then the flow of the second fluid may be decreased to drive the mix ratio toward the pre-selected set point ratio.

In one or more embodiments, the one or more controllers 128, e.g., a programmable logic controller, may be in communication with the flow control valve 118 and configured to control the flow control valve. For example, in some embodiments, the one or more controllers 128 may govern the flow control valve 118 to maintain pressure at the tank flow meter 116 between about 15 psi and about 25 psi. In at least one embodiment, the one or more controllers 128 may be configured to compare the mix ratio to a pre-selected set point ratio to determine a modified flow of the second fluid. In some embodiments, the one or more controllers 128 may be configured to send a control signal to the flow control valve 118 to control the valve setting and thereby the flow of the second fluid in order to drive the mix ratio toward the pre-selected set point ratio. If the mix ratio is lower than the pre-selected set point ratio, then the flow control valve 118 may be opened to increase the flow of the second fluid to drive the mix ratio toward the pre-selected set point ratio. Likewise, if the mix ratio is higher than the pre-selected set point ratio, then the flow control valve 118 may be pinched to reduce the flow of the second fluid to drive the mix ratio toward the pre-selected set point ratio.

In one or more embodiments of in-line mixing systems 100, the variable speed drive (VFD) 132 and the flow control valve 118 may work together based on input from the one or more controllers 128, including the programmable logic controller. In some embodiments, for example, when the speed of the first pump 110 drops below 60%, the programmable logic controller may send a signal to pinch the flow control valve 118 (e.g., reducing the pressure at the output of the flow control valve by about 5 psi) to force the first pump 110 to increase speed to maintain the mix ratio. Likewise, if the speed of the first pump 110 increases to 100%, the programmable logic controller may send a signal to the flow control valve 118 to open the flow control valve 118 (e.g., increasing the pressure at the output of the flow control valve by about 5 psi) to force the first pump 110 to decrease speed to maintain the mix ratio. Generally, the pressure at the flow control valve 118 is maintained at about 20 psi when the in-line mixing system is maintained at steady state.

Figure 2:
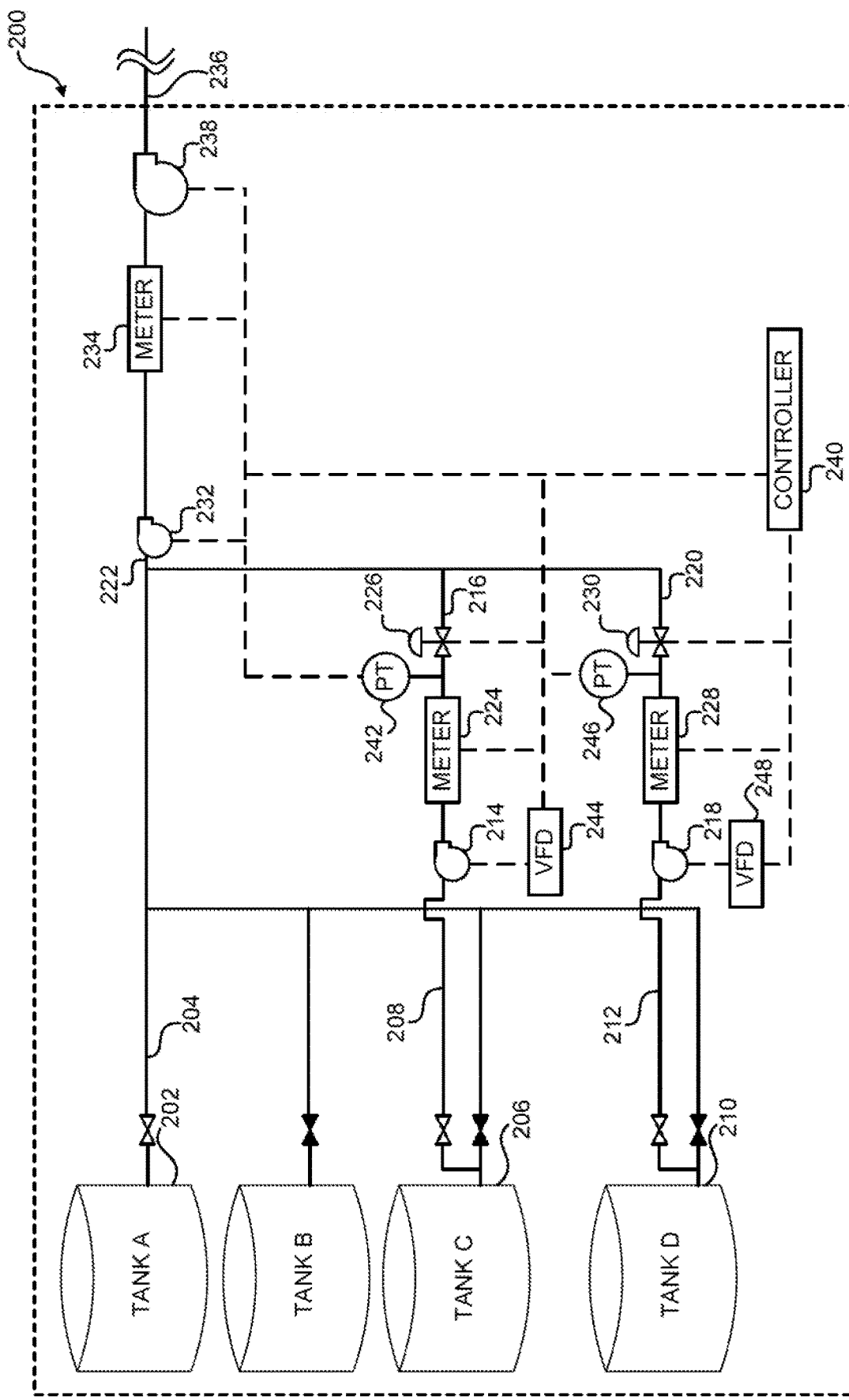
FIG. 2 is a schematic diagram of a three-component in-line mixing system positioned at a tank farm to admix three hydrocarbon liquids from separate tanks into a single pipeline according to an embodiment of the disclosure.
Figure 3:
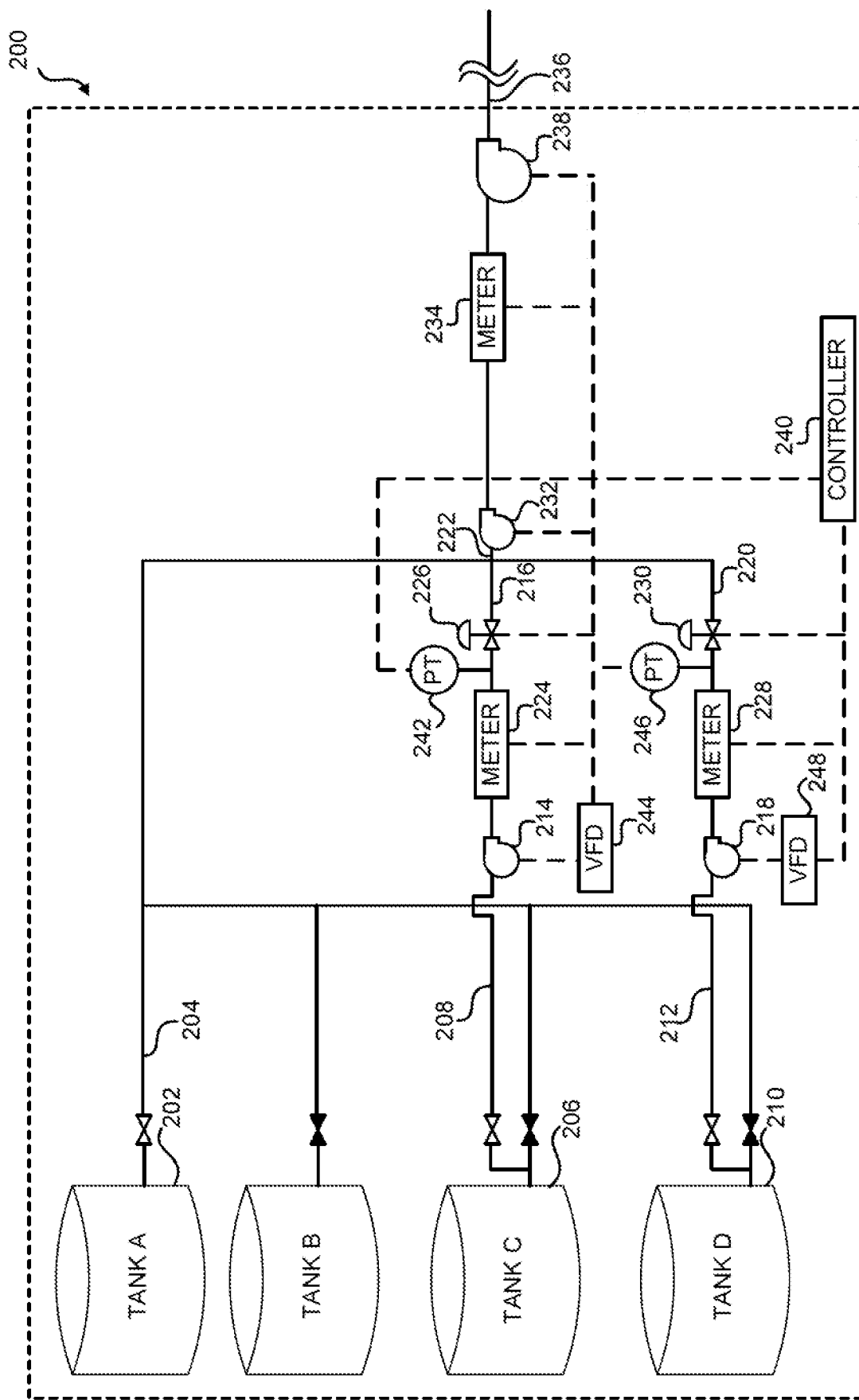
FIG. 3 is a schematic diagram of a three-component in-line mixing system positioned at a tank farm to admix three hydrocarbon liquids from separate tanks into a single pipeline according to an embodiment of the disclosure.
Figure 4:
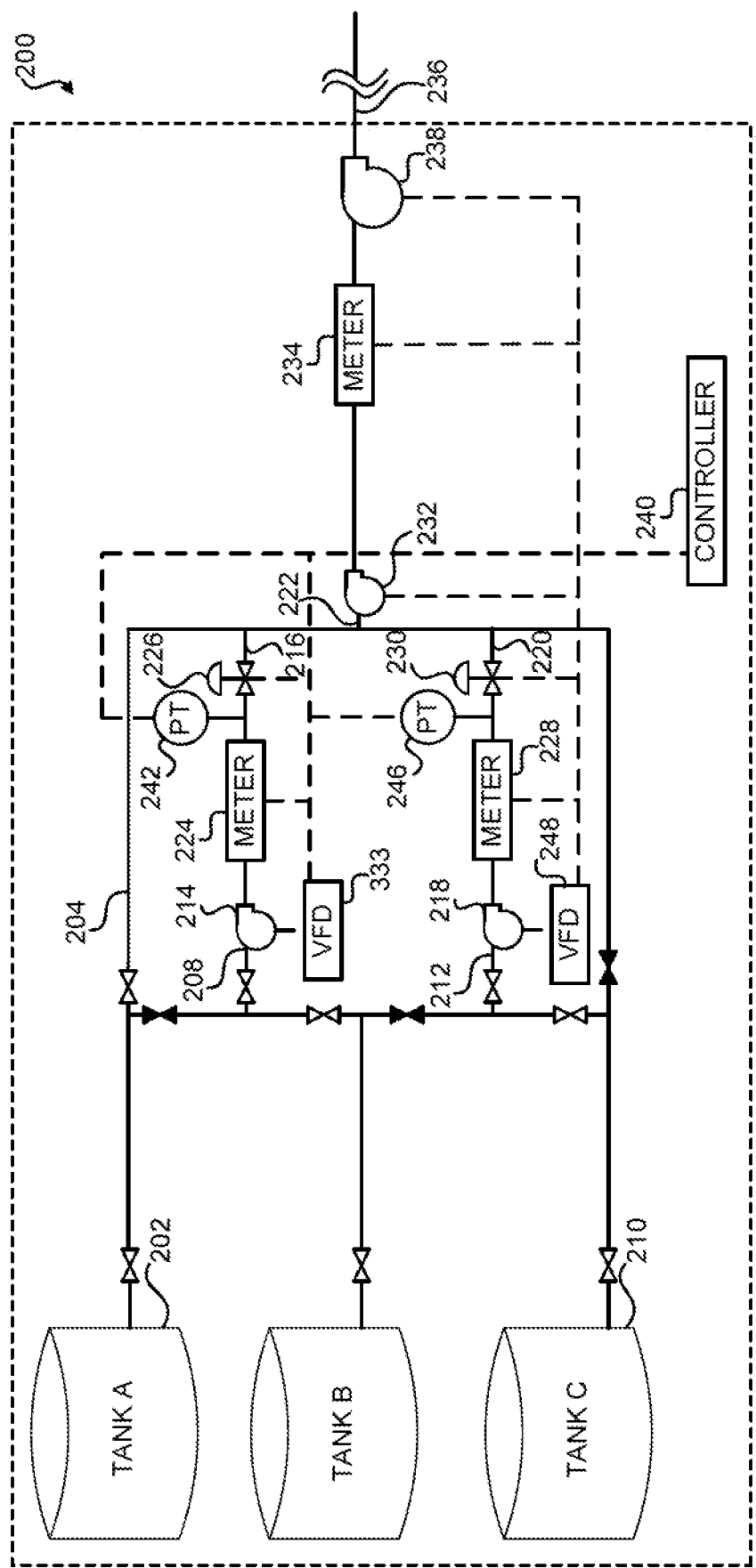
FIG. 4 is a schematic diagram of a three-component in-line mixing system positioned at a tank farm admix three hydrocarbon liquids from separate tanks into a single pipeline.

As noted above, in one or more embodiments, the system and methods described herein may provide in-line mixing of three or more component blends in a single pipe. For example, FIGS. 2-4 depict process diagrams of non-limiting, three-component in-line mixing system according to various embodiments of the disclosure. In particular, FIGS. 2-4 illustrate embodiments, of three-component in-line mixing systems 200 positioned at a tank farm (e.g., as depicted by the dashed rectangular boxes in FIGS. 2-4) to admix three hydrocarbon liquids from separate tanks into a single pipeline to provide a two-component blended fluid flow. As shown in FIGS. 2-4, a three-component in-line mixing system may include a first tank 202 positioned in a tank farm and containing a first fluid therein. Generally, the first fluid includes one or more hydrocarbon liquids, of a first density or gravity, as defined herein above and as would be understood by a person of skill in the art. In some embodiments, the first tank may include a first output pipe 204 connected to the first tank 202 proximate a bottom portion thereof and the first output pipe 204 may be in fluid communication with the first fluid to transport a flow of the first fluid from the first tank 202 through the first output pipe 204 at a first pressure. In some embodiments, the first pressure may be in the range of about 0.1 psi to about 100 psi, about 0.5 psi to about 50 psi, or about 1 psi to about 10 psi. In some embodiments, the first pressure may be less than about 20 psi, less than about 10 psi, less than about 5 psi, or less than about 1 psi. In the embodiments depicted in FIGS. 2-4, the first pressure results from force of gravity on the first fluid contained in the first tank.

In one or more embodiments, the three-component in-line mixing system may include a second tank 206 positioned in the tank farm and containing a second fluid therein. Generally, the second fluid includes one or more hydrocarbon liquids, of a second density or gravity, as defined herein above and as would be understood by a person of skill in the art. In some embodiments, the second tank 206 may include a second output pipe 208 connected to the second tank 206 proximate a bottom portion thereof and the second output pipe 208 may be in fluid communication with the second fluid to transport a flow of the second fluid from the second tank 206 through the second output pipe 208 at a second pressure. In some embodiments, the second pressure may be in the range of about 0.1 psi to about 100 psi, about 0.5 psi to about 50 psi, or about 1 psi to about 10 psi. In some embodiments, the second pressure may be less than about 20 psi, less than about 10 psi, less than about 5 psi, or less than about 1 psi. Similar to the first pressure, the second pressure also results from force of gravity on the second fluid contained in the second tank 206.

In one or more embodiments, the three-component in-line mixing system may include a third tank 210 positioned in the tank farm and containing a third fluid therein. Generally, the third fluid includes one or more hydrocarbon liquid, of a third density or gravity, as defined herein above and as would be understood by a person of skill in the art. In some embodiments, the third tank 210 may include a third output pipe 212 connected to the third tank 210 proximate a bottom portion thereof and the third output pipe 212 may be in fluid communication with the third fluid to transport a flow of the third fluid from the third tank 210 through the third output pipe 212 at a third pressure. In some embodiments, the third pressure may be in the range of about 0.1 psi to about 100 psi, about 0.5 psi to about 50 psi, or about 1 psi to about 10 psi. In some embodiments, the second pressure may be less than about 20 psi, less than about 10 psi, less than about 5 psi, or less than about 1 psi. Similar to the first and second pressures, the third pressure also results from the force of gravity on the third fluid contained in the third tank 210.

In one or more embodiments, three-component in-line mixing systems 200 as described herein may include a second tank pump 214 having an inlet and an outlet. For example, the inlet of the second tank pump 214 may be connected to the second output pipe 208 to increase pressure of the flow of the second fluid from the second pressure to a second pump pressure at the outlet of the second tank pump 214. In some embodiments, the second pump pressure at the outlet of the second tank pump 214 may be in the range of about 1 psi to about 100 psi, about 10 psi to about 50 psi, or about 25 psi to about 35 psi. In some embodiments, the second pump pressure at the outlet of the second tank pump 214 may be at least about 10 psi, at least about 20 psi, at least about 30 psi, at least about 40 psi, at least about 50 psi, or higher. Further, this second tank pump 214 may have a horsepower between 1 hp and 500 hp, between 50 and 250 hp or between 125 hp and 175 hp. In such embodiments, the second tank pump 214 may have a horsepower of 500 hp or less, 400 hp or less, 300 hp or less, 200 hp or less, 100 hp or less, and lower. Generally, the second pump pressure at the outlet of the second tank pump 214 is greater than the second pressure in the second output pipe 208. In some embodiments, a second tank mixing booster pipe 216 may be connected to the outlet of the second tank pump 214 to transport the flow of the second fluid therethrough. In some embodiments, three-component in-line mixing systems 200 as described herein may include a second variable speed drive 244 connected to the second tank pump 214 to control pump speed to thereby adjust the flow of the second fluid through the second tank pump 214. The specific type and/or configuration of the second variable speed drive 244 may vary as would be understood by a person of skill in the art.

In one or more embodiments, three-component in-line mixing systems 200 as described herein may include a third tank pump 218 having an inlet and an outlet. For example, the inlet of the third tank pump 218 may be connected to the third output pipe 212 to increase pressure of the flow of the third fluid from the third pressure to a third pump pressure at the outlet of the third tank pump 218. In some embodiments, the third pump pressure at the outlet of the third tank pump 218 may be in the range of about 1 psi to about 100 psi, about 10 psi to about 50 psi, or about 25 psi to about 35 psi. In some embodiments, the third pump pressure at the outlet of the third tank pump 218 may be at least about 10 psi, at least about 20 psi, at least about 30 psi, at least about 40 psi, at least about 50 psi, or higher. Further, this third tank pump 218 may have a horsepower between 1 hp and 500 hp, between 50 and 250 hp or between 125 hp and 175 hp. In such embodiments, the third tank pump 218 may have a horsepower of 500 hp or less, 400 hp or less, 300 hp or less, 200 hp or less, 100 hp or less, and lower. Generally, the third pump pressure at the outlet of the third tank pump 218 is greater than the third pressure in the third output pipe 212. In some embodiments, a third tank mixing booster pipe 220 may be connected to the outlet of the third tank pump 218 to transport the flow of the third fluid therethrough. In some embodiments, three-component in-line mixing systems 200 as described herein may include a third variable speed drive 248 connected to the third tank pump 218 to control pump speed to thereby adjust the flow of the third fluid through the third tank pump 218. The specific type and/or configuration of the third variable speed drive 248 may vary as would be understood by a person of skill in the art.

As depicted in FIGS. 2-4, in some embodiments, three-component in-line mixing systems 200 may include a blended fluid pipe 222 connected to and in fluid communication with the first output pipe 204, the second tank mixing booster pipe 216, and the third tank mixing booster pipe 220 to admix the flow of the first fluid at the first pressure, the flow of the second fluid, and the flow of the third fluid into a blended fluid flow. In some embodiments, the pressures of the third fluid, the second fluid, and the first fluid may be about the same at the portion of the blended fluid pipe 222 configured to admix the flow of the first fluid, the flow of the second fluid, and the flow of the third fluid into the blended fluid flow.

As noted in FIGS. 2-4, for example, the connection point between the first output pipe 204, the second tank mixing booster pipe 216, the third tank mixing booster pipe 220, and the blended fluid pipe 222 may vary in different embodiments. As depicted in FIG. 2, for example, the blended fluid pipe 222 may be directly in line with the first output pipe 204 (i.e., the gravity fed output line) with the second tank mixing booster pipe 216 and the third tank mixing booster pipe 220, or a combined pipe thereof, flowing into first output pipe/blended fluid pipe junction, e.g., through a tee joint or y joint. As depicted in FIG. 3, the blended fluid pipe 222 may be directly in line with the second tank mixing booster pipe 216 or, in another example, the third tank mixing booster pipe 220 such that the first output pipe 204 is routed to flow into the junction between the blended fluid pipe and the second tank mixing booster pipe 216 and/or third tank mixing booster pipe 220, e.g., through a tee joint, y joint, or four-way joint. Further, as depicted in FIG. 4, any one of the plurality of tanks in the tank farm may be configurable to be a gravity fed line (e.g., such as the first output pipe 204 in FIG. 2) or to be a controlled, tank output stream (e.g., such as the second tank mixing booster pipe 216 or the third tank mixing booster pipe 220 in FIG. 2). For example, the first tank 202 may be configured to be the gravity fed line or the third tank 210 may, instead, be configured as the gravity fed line. Likewise, the first tank 202 or the third tank 210 may be configured to be a controlled, tank output stream. Such configurations and arrangements are not intended to be limiting and are presented by way of example only. Generally, the configuration and/or arrangement of the first output pipe, the second tank mixing booster pipe, the third tank mixing booster pipe, and the blended fluid pipe may vary based on the configuration of the tank farm.

Referring again to FIGS. 2-4, in some embodiments of three-component in-line mixing systems 200 as described herein, a second tank flow meter 224 may be connected to the second tank mixing booster pipe 216 and positioned between the second tank pump 214 and the blended fluid pipe 222 to measure flow rate of the flow of the second fluid between the second tank pump 214 and the blended fluid pipe 222. The second tank flow meter 224 may be a turbine flow meter or another type of flow meter as would be known to those skilled in the art. Generally, the booster flow meter 234 may provide flow readings in the form of barrels per hour of hydrocarbon liquids. In another embodiment, the second tank flow meter 224 may include a sensor or functionality to measure a density or gravity of the blended fluid or liquid (e.g., a mass flow meter or other meter as will be understood by those skilled in the art). In some embodiments, a second tank flow control valve 226 may be connected to the second tank mixing booster pipe 216 between the second tank flow meter 224 and the blended fluid pipe 222 to control the flow of the second fluid between the second tank pump 214 and the blended fluid pipe 222. In some embodiments, a second tank pressure sensor/transducer 242 may also be connected to the second tank mixing booster pipe 216 and positioned upstream of the second tank flow control valve 226. In some embodiments, for example, the second tank pressure sensor/transducer 242 may be connected to the second tank mixing booster pipe 216 between the second tank flow meter 224 and the second tank flow control valve 226. The second tank pressure sensor/transducer 242 may be configured to measure the back pressure at the second tank flow control valve 226. Any type of pressure sensor/transducer may be used to measure the back pressure at the second tank flow control valve 226 as would be understood by a person of skill in the art.

In some embodiments, three-component in-line mixing systems 200 as described herein may include a third tank flow meter 228 connected to the third tank mixing booster pipe 220 and positioned between the third tank pump 218 and the blended fluid pipe 222 to measure flow rate of the flow of the third fluid between the third tank pump 218 and the blended fluid pipe 222. The third tank flow meter 228 may be a turbine flow meter or another type of flow meter as would be known to those skilled in the art. Generally, the third tank flow meter 228 may provide flow readings in the form of barrels per hour of hydrocarbon liquids. In another embodiment the third tank flow meter 228 may include a sensor or functionality to measure a density or gravity of the blended fluid or liquid (e.g., a mass flow meter or other meter as will be understood by those skilled in the art). In some embodiments, a third tank flow control valve 230 may be connected to the third tank mixing booster pipe 220 between the third tank flow meter 228 and the blended fluid pipe 222 to control the flow of the third fluid between the third tank pump 218 and the blended fluid pipe 222. In some embodiments, a third tank pressure sensor/transducer 246 may also be connected to the third tank mixing booster pipe 220 and positioned upstream of the third tank flow control valve 230. In some embodiments, for example, the third tank pressure sensor/transducer 246 may be connected to the third tank mixing booster pipe 220 between the third tank flow meter 228 and the third tank flow control valve 230. The third tank pressure sensor/transducer 246 may be configured to measure the back pressure at the third tank flow control valve 230. Any type of pressure sensor/transducer may be used to measure the back pressure at the third tank flow control valve 230 as would be understood by a person of skill in the art.

In one or more embodiments, three-component in-line mixing systems 200 and methods may include a booster pump 232 having an inlet in fluid communication with the blended fluid pipe 222 and an outlet. Generally, the booster pump 232 will have a greater horsepower than the second tank pump 214 and the third tank pump 218 and thus, the pump pressure at the outlet of the booster pump 232 may be greater than the pump pressure at the outlet of the second tank pump 214 and/or the third tank pump 218. In some embodiments, for example, the pump pressure at the outlet of the booster pump 232 may be in the range of about 50 psi to about 500 psi, about 100 psi to about 300 psi, or about 150 psi to about 200 psi. In some embodiments, the pump pressure at the outlet of the booster pump 232 may be at least about 50 psi, at least about 100 psi, at least about 150 psi, at least about 200 psi, or higher. Further, the booster pump 232 may have a horsepower between 250 hp and 2,500 hp, between 500 and 2,000 hp or between 750 hp and 1,500 hp. In such embodiments, the booster pump 232 may have a horsepower of as much as 250 hp, 500 hp, 750 hp, 1,000 hp, 1,250 hp, 1,500 hp or more. The booster pump 232 is positioned relative to the second tank pump 214, the third tank pump 218 and the first tank 202 such that the pressure in the blended fluid pipe 222 at the inlet or suction of the booster pump 232 is sufficiently high to preclude cavitation within the booster pump 232. Generally, the pump pressure at the outlet of the booster pump 232 is considerably higher than the pressure at the outlet of the second tank pump 214 and/or the third tank pump 218 to ramp up the pressure of the blended fluid flow prior to transfer to the pipeline 236.

In some embodiments, three-component in-line mixing systems 200 as described herein may include a booster flow meter 234 in fluid communication with the blended fluid pipe 222 to measure total flow rate of the blended fluid flow transported through the blended fluid pipe 222. The booster flow meter 234 may be a turbine flow meter or another type of flow meter as would be known to those skilled in the art. Generally, the booster flow meter may provide flow readings in the form of barrels per hour of hydrocarbon liquids. In some embodiments, the three-component in-line mixing systems 200 as described herein may include a pipeline 236 connected to the outlet of the booster pump 232 to transport the blended fluid flow therethrough and away from the tank farm, e.g., to a pipeline origination station. In one or more embodiments, the three-component in-line mixing systems 200 described herein, and as shown in FIGS. 2-4, may include a pipeline origination station pump 238 positioned between the outlet of the booster pump 232 and the pipeline 236. The pipeline origination station pump 238 is arranged to be in fluid communication with the outlet of the booster pump 232, the booster flow meter 234 and the pipeline 236. Generally, the pipeline origination station pump 238 may have a greater horsepower and a greater outlet pump pressure than each of the second tank pump 214, the third tank pump 218, and the booster pump 232 in order to transport the blended fluid flow at much higher pressures through the pipeline 236. Such higher pressures are generally required for pumping the blended fluid flow through long pipelines before reaching a final destination. For example, such pipelines may be in excess of hundreds of miles in length. In some embodiments, the pump pressure at the outlet of the pipeline origination station pump 238 may be in the range of about 100 psi to about 10,000 psi, about 500 psi to about 5,000 psi, or about 1,000 psi to about 2,000 psi. In some embodiments, the pump pressure at the outlet of the second tank pump 214 and/or third tank pump 218 may be at least about 500 psi, at least about 1,000 psi, at least about 1,500 psi, or higher. Further, the pipeline origination station pump 238 may have a horsepower between 1,000 hp and 5,000 hp, between 2,000 and 4,500 hp or between 3,000 hp and 4,000 hp. In such embodiments, the pipeline origination station pump 238 may have a horsepower of as much as 2,500 hp, 3,000 hp, 3,500 hp, 4,500 hp, 5,000 hp or more. While the pipeline origination station pump 238 is shown in FIGS. 2-4 as being within the tank farm (e.g. as depicted by the dashed rectangular box in FIGS. 2-4), the pipeline origination station pump 238 (and start of the pipeline 236) may be located a distance apart from the tank farm, e.g., less than one mile, less than two or less than three miles. However, the pipeline origination station pump 238 may be positioned relative to the booster pump 232 such that the pressure at the inlet or suction of the pipeline origination station pump 238 is sufficiently high to preclude cavitation within the pipeline origination station pump 238.

In one or more embodiments, three-component in-line mixing systems 200 as described herein may include one or more controllers 240 in communication with the second tank flow meter 224, the third tank flow meter 228, the booster flow meter 234, the second tank pressure sensor/transducer 242, the second variable speed drive 244, the third tank pressure sensor/transducer 246, and the third variable speed drive 248. Generally, the one or more controllers 240 may perform a variety of functions (e.g., determining mix ratios, flow rates, various densities, various gravities, corrected mix ratios, and/or controlling one or more functions of various components within the system). In some embodiments, the one or more controllers 240 may be configured to determine percentages of the first fluid flow rate, the second fluid flow rate, and the third fluid flow rate in the total blended flow responsive to one or more signals received from the second tank flow meter 224, the third tank flow meter 228, and the booster flow meter 234. For example, the booster flow meter 234 may be configured to measure a total flow rate of the blended fluid flow therethrough; the second tank flow meter 224 may be configured to measure the flow rate of the flow of the second fluid therethrough; and the third tank flow meter 228 may be configured to measure the flow rate of the flow of the third fluid therethrough, such that the difference in the total flow rate of the blended fluid flow, the flow rate of the flow of the second fluid, and the flow rate of the flow of the third fluid is approximately equal to the flow rate of the flow of the first fluid (e.g., which is gravity-fed). In some embodiments, each of the second tank flow meter 224, the third tank flow meter 228 and the booster flow meter 234 may provide flow readings in units of barrels per hour of hydrocarbon liquids. For example, if the booster flow meter 234 indicates that the blended fluid flow has a flow rate of 10,000 barrels per hour and the second tank flow meter 224 indicates that the flow rate of second fluid flow is 4,000 barrels per hour and the third tank flow meter 228 indicates that the flow rate of the third fluid flow is 5,000 barrels per hour, then the calculated flow rate of the first fluid flow is 1,000 barrels per hour (e.g., providing mix percentages in the blended flow of 50/40/10 (third fluid: second fluid: first fluid)). In some embodiments, the one or more controllers 240 may be in communication with each of the second tank flow meter 224, the third tank flow meter 228, and the booster flow meter 234 to determine flow rate of the first fluid from the first tank 202 responsive to signals received from the second tank flow meter 224, third tank flow meter 228, and the booster flow meter 234.

In some embodiments, the percentages of the third fluid flow to the second fluid flow to the first fluid flow may be referred to herein as the mix percentages of the blended fluid flow. In some embodiments, the mix percentages may be varied in the range of about 1 percent to about 98 percent for each of the first fluid flow, the second fluid flow, and the third fluid flow. For example, in some embodiments, the blended fluid flow may include the first fluid flow in an amount of at least 5 percent, at least 10 percent, at least 15 percent, at least 20 percent, at least 25 percent, at least 30 percent, at least 35 percent, at least 40 percent, at least 45 percent, at least 50 percent, at least 55 percent, at least 60 percent, at least 65 percent, at least 70 percent, at least 75 percent, at least 80 percent, at least 85 percent, at least 90 percent, at least 95 percent, or more. In some embodiments, the blended fluid flow may include the second fluid flow in an amount of at least 5 percent, at least 10 percent, at least 15 percent, at least 20 percent, at least 25 percent, at least 30 percent, at least 35 percent, at least 40 percent, at least 45 percent, at least 50 percent, at least 55 percent, at least 60 percent, at least 65 percent, at least 70 percent, at least 75 percent, at least 80 percent, at least 85 percent, at least 90 percent, at least 95 percent, or more. In some embodiments, the blended fluid flow may include the third fluid flow in an amount of at least 5 percent, at least 10 percent, at least 15 percent, at least 20 percent, at least 25 percent, at least 30 percent, at least 35 percent, at least 40 percent, at least 45 percent, at least 50 percent, at least 55 percent, at least 60 percent, at least 65 percent, at least 70 percent, at least 75 percent, at least 80 percent, at least 85 percent, at least 90 percent, at least 95 percent, or more. In some embodiments, the percentages of the third fluid flow to the second fluid flow to the first fluid flow may be referred to in terms of a percentage mix ratio. For example, in some embodiments, the percentage mix ratio may be about 50:49:1 (third fluid: second fluid: first fluid). In other embodiments, the percentage mix ratio may be about 50:46:4 (third fluid: second fluid: first fluid). Generally, the percentage mix ratio may be varied such that any of the fluid flows are provided in amount between about 1 percent and about 98 percent of the total blended flow.

Advantageously, the systems and methods of in-line mixing as described herein provide far more accurate control of the mix ratio (both at the beginning of a blending operation run and for the duration of the blending operation run) than typically provided with other blending methods commonly used in the art. For example, in-line mixing systems and methods according to the disclosure may maintain the mix percentages within about +/−1.0 percent of the desired/pre-selected set point percentages. In some embodiments, in-line mixing systems and methods according to the disclosure may maintain the mix percentages within about +/−1.0 percent, about +/−0.5 percent, about +/−0.25 percent, about +/−0.1 percent, or about +/−0.05 percent of the desired/pre-selected set point percentages.

In at least one embodiment, the one or more controllers 240 may include a programmable logic controller. The one or more controllers 240 may be in communication with one or more variable speed drives (e.g., connected to the second tank pump 214 and/or to the third tank pump 218) and configured to control the variable speed drives. In some embodiments, for example, in-line mixing systems and methods of the disclosure may include a second variable speed drive 244 connected to the second tank pump 214 and a third variable speed drive 248 connected to the third tank pump 218. In such embodiments, the one or more controllers 240 may be configured to compare the mix percentages to a pre-selected set point percentages and to determine a modified flow of one or both of the second fluid flow and the third fluid flow, if necessary, to bring the mix percentages closer to the pre-selected set point percentages. For example, the one or more controllers 240 may be configured to send a control signal to at least one of the second variable speed drive 244 and the third variable speed drive 248 to control the pump speed of the second tank pump 214 and/or third tank pump 218, respectively, and thereby adjust the flow of at least one of the second fluid and the third fluid in order to drive the mix percentages toward the pre-selected set point percentages.

In one or more embodiments, the one or more controllers 240 may be in communication with second tank flow meter 224, third tank flow meter 228, and booster flow meter 234. The one or more controllers 240 may obtain or determine a density or gravity for each liquid flowing through second tank flow meter 224, third tank flow meter 228, and booster flow meter 234. In such examples, the one or more controllers 240 may include a target blend density or gravity or a preset blend density or gravity. Such a target blend density or gravity may indicate the desired or target density or gravity of the blended fluid. As is illustrated in FIGS. 2-4, a meter may not be associated with the first tank 202. In other words, the density or gravity may not be measured for the first tank 202. Further, the one or more controllers 240 may determine the first density or gravity of the first liquid, based on the second density or gravity (obtained or determined via second tank flow meter 224), the third density or gravity (obtained or determined via third tank flow meter 228), and the blend density or gravity (obtained or determined via booster flow meter 234). Once all densities or gravities are available, the one or more controllers 240 may compare the blend density or gravity with the target blend density or gravity. Based on differences of such comparisons, the one or more controllers 240 may determine a corrected mix ratio. The one or more controllers 240 may adjust the flow, based on the corrected mix ratio, of at least one of the second fluid and the third fluid, via the second variable speed drive 244 and the third variable speed drive 248 and/or second tank flow control valve 226 and the third tank flow control valve 230, in order to drive the blend density or gravity toward the target or preset blend density or gravity.

In one or more embodiments, the one or more controllers 240, e.g., a programmable logic controller, may be in communication with one or both of the second tank flow control valve 226 and the third tank flow control valve 230, and configured to control one or both of the second tank flow control valve 226 and the third tank flow control valve 230. For example, in some embodiments, the one or more controllers 240 may govern the second tank flow control valve 226 and the third tank flow control valve 230 to maintain pressure at each of the second tank flow meter 224 and the third tank flow meter 228 between about 15 psi and about 25 psi. In at least one embodiment, the one or more controllers 240 may be configured to compare the mix percentages to pre-selected set point percentages to determine a modified flow of one or both of the second fluid and the third fluid. In some embodiments, the one or more controllers 240 may be configured to send a control signal to at least one of the second tank flow control valve 226 and the third tank flow control valve 230 to control the respective valve setting and thereby the flow of second fluid and third fluid, respectively, in order to drive the mix percentages toward the pre-selected set point percentages.

In one or more embodiments of in-line mixing systems, the second variable speed drive 244 and the second tank flow control valve 226 may work together based on input from the one or more controllers 240, including the programmable logic controller. In some embodiments, the third variable speed drive 248 and the third tank flow control valve 230 may work together based on input from the one or more controllers 240, including the programmable logic controller. In some embodiments, for example, when the speed of the second tank pump 214 and/or the third tank pump 218 drops below 60%, the programmable logic controller may send a signal to pinch the second tank flow control valve 226 and/or the third tank flow control valve 230 (e.g., reducing the pressure at the output of the flow control valve by about 5 psi), respectively, to force the second tank pump and/or the third tank pump to increase speed to maintain the desired mix percentages. Likewise, if the speed of the second tank pump 214 and/or the third tank pump 218 increases to 100%, the programmable logic controller may send a signal to open the second tank flow control valve 226 and/or the third tank flow control valve 230 (e.g., increasing the pressure at the output of the flow control valve by about 5 psi), respectively, to force the second tank pump 214 and/or the third tank pump 218 to decrease speed to maintain the desired mix percentages. Generally, the pressure at both the second tank flow control valve 226 and the third tank flow control valve 230 is maintained at about 20 psi when the in-line mixing system is maintained at steady state.

Figure 5:
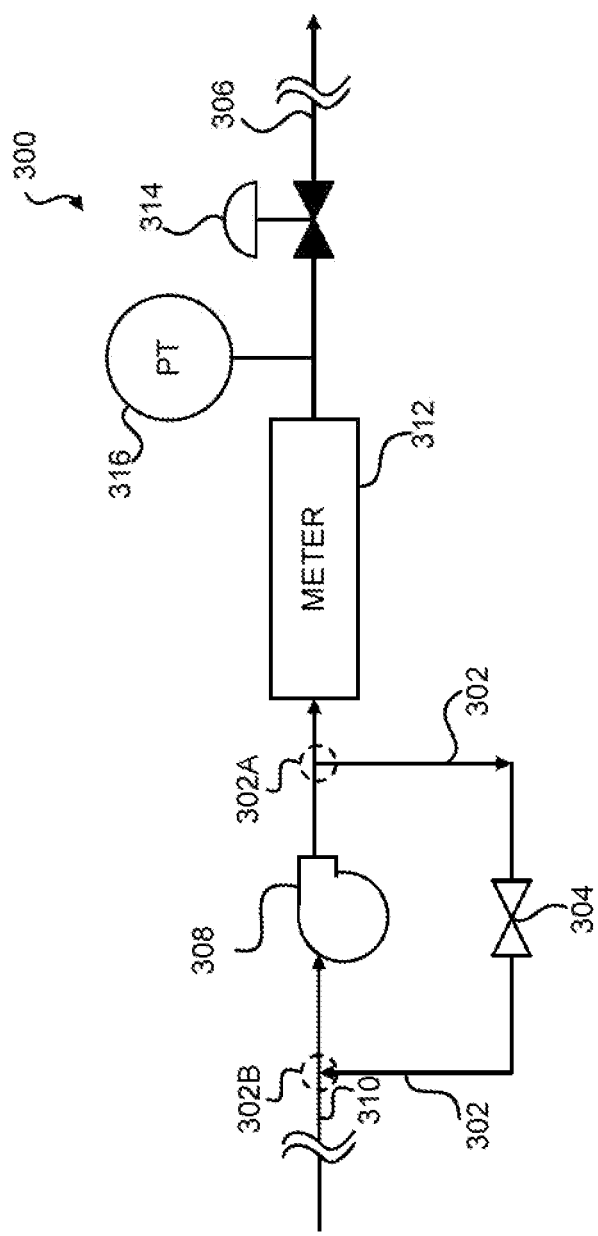
FIG. 5 is a schematic diagram of a control system on a single fluid line, the control system including tank output pipe, a pump, a mixing booster pipe, a blended fluid pipe, a tank flow meter, a flow control valve, a recirculation pipe, and a one-way valve disposed in the recirculation pipe, according to an embodiment of the disclosure.

FIG. 5 depicts a process diagram of a controlled, tank output stream 300 having a recirculation loop, the controlled output stream includes a recirculation pipe 302, and a one-way valve 304 disposed in the recirculation pipe, a mixing booster pipe 306, a pump 308, an output pipe 310, a tank flow meter 312, and a flow control valve 314. As depicted in FIG. 5, the controlled, tank output stream line may include an end portion 302a of a recirculation pipe 302 connected to and in fluid communication with a mixing booster pipe 306 downstream of a pump 308 and another end portion 302B of the recirculation pipe 302 connected to and in fluid communication with an output pipe 310. Thus, the recirculation pipe 302 is arranged to recirculate a fluid therethrough in order to maintain a minimum flow of the fluid through the pump 308. In some embodiments, the recirculation loop may include a one-way valve 304 disposed in the recirculation pipe 302 to prevent flow of the fluid from the output pipe to the mixing booster pipe 306.

A recirculation loop as depicted in FIG. 5 (e.g., including a recirculation pipe 302 and a one-way valve 304 disposed in the recirculation pipe 302) may be used in combination with any of the controlled, tank output streams in the systems described herein above (e.g., such as those depicted in FIGS. 1-4). In such embodiments, the recirculation pipe 302 may be positioned proximate to the pump 308 connected to the tank output pipe in the controlled, tank output streams (e.g., such as the second output pipe 108 in FIG. 1 and/or the second output pipe 208 in FIGS. 2-4 and/or the third output pipe 212 in FIGS. 2-4). In FIG. 1, for example, a recirculation pipe 302 and a one-way valve 304 disposed in the recirculation pipe 302 may be positioned proximate to first pump 110 to provide a recirculation system having the same components depicted in FIG. 5. In such embodiments, the recirculation pipe 302 may be configured to permit flow therethrough only when a ratio of the flow of second fluid to the flow of first fluid falls below a pre-selected threshold. In FIGS. 2-4, for example, a recirculation pipe 302 and a one-way valve 304 disposed in the recirculation pipe 302 may be positioned proximate one or both of second tank pump 214 and third tank pump 218 to provide a recirculation system having the same components depicted in FIG. 5. In such embodiments, the recirculation pipe 302 may be configured to permit flow therethrough when the flow of the second fluid is below a pre-selected percentage (e.g., when the recirculation pipe 302 is positioned proximate second pump tank 214) and/or configured to permit flow therethrough when the flow of the third fluid is below a pre-selected percentage (e.g., when the recirculation pipe 302 is positioned proximate third pump tank 218).

In one or more embodiments, in-line mixing systems and methods according to the disclosure may include a recirculation loop in each of the controlled, tank output streams. In such embodiments, the one-way valve 304 disposed in the recirculation pipe 302 may be in communication with one or more control components as described herein above. In some embodiments, if the flow control valve 314 holds a back pressure that exceeds a pre-selected setting (as determined by a pressure sensor/transducer 316 positioned upstream of the flow control valve 314) and the pump 308 falls at or below 60 percent operational capacity or throughput, the one or more controllers will send a signal to the one-way valve 304 to open the one-way valve 304. The pump 308 then pumps fluid through the recirculation pipe 302 via the open one-way valve 304 and back to the suction inlet of the pump 308, which increases fluid flow through the pump 308. Accordingly, the pump 308 is permitted to operate at greater than 60% throughout even while the flow control valve 314 holds a back pressure exceeding the pre-selected setting. Once the back pressure drops below a pre-selected value (as determined by the pressure sensor/transducer 316 positioned upstream of the valve), which corresponds to the valve opening to permit greater fluid flow therethrough, the one or more controllers will send a signal to the one-way valve to close. Advantageously, these three components (i.e., the variable speed pump, the flow control valve, and the recirculation loop) may work together to prevent damage (e.g., cavitation) to the pump by maintaining an acceptable flow rate through the pump at all times.

Some aspects of the disclosure relate to methods of admixing hydrocarbon liquids (such as those described herein above) from a plurality of tanks into a single pipeline, e.g., using one or more system embodiments herein, to provide in-line mixing thereof. As noted herein above, the systems and methods described herein are intended to be suitable for providing mixing of two or more hydrocarbon liquids in-line, e.g., to provide two-component blended flows, three-component blended flows, or blended flows having more than three components.

In one or more embodiments, for example, methods for admixing two hydrocarbon liquids from a plurality of tanks into a single pipeline may include determining a ratio of a second fluid flow to a first fluid flow based on signals received from a tank flow meter in fluid communication with the second fluid flow and a booster flow meter in fluid communication with a blended fluid flow. In such embodiments, the blended fluid flow may include a blended flow of the first fluid flow and the second fluid flow. In one or more embodiments, the methods described herein may include comparing the determined ratio to a pre-selected set point ratio to thereby determine a modified flow of the second fluid flow in order to drive the ratio toward the pre-selected set point ratio. In some embodiments, the methods described herein may include controlling a variable speed drive connected to a pump to thereby control the second fluid flow through the pump based on the determined modified flow.

In some embodiments, one or more methods as described herein may include maintaining the difference between the determined ratio and the pre-selected set point ratio within a pre-selected error range. For example, the pre-selected error range may be in the range of about 1.0% to −1.0%, about 0.5% to about −0.5%, about 0.25% to about −0.25%, about 0.1% to about −0.1%, or about 0.05% to about −0.05%, based on the pre-selected set point.

In some embodiments, one or more methods as described herein may include determining a flow rate of the first fluid flow, which is gravity-fed, based on the signals received from the tank flow meter and the booster flow meter. In some embodiments, the pressure of the first fluid flow may be about equal to pressure of the second fluid flow at the junction of the blended fluid pipe. In some embodiments, one or more methods as described herein may include controlling a flow control valve in fluid communication with the second fluid flow to thereby control the second fluid flow based on the determined modified flow. In some embodiments, one or more methods may include controlling a flow control valve in fluid communication with the second fluid flow to thereby maintain pressure at the tank flow meter between about 15 psi and about 25 psi.

In one or more embodiments, for example, methods for admixing three hydrocarbon liquids from a plurality of tanks into a single pipeline may include determining percentages of flow rates of a first fluid flow, a second fluid flow, and a third fluid flow in a blended fluid flow based on signals received from a second tank flow meter in fluid communication with the second fluid flow, a third tank flow meter in fluid communication with the third fluid flow, and a booster flow meter in fluid communication with the blended fluid flow. In such embodiments, the blended fluid flow may include a blended flow of the first fluid flow, the second fluid flow, and the third fluid flow. In some embodiments, such methods may include comparing the determined percentages to pre-selected percentages to thereby determine modified flows of the second fluid and the third fluid in order to drive the determined percentages toward the pre-selected percentages. In some embodiments, such methods may include controlling at least one of a second variable speed drive connected to a second pump and a third variable speed drive connected to a third pump to thereby control at least one of the second fluid flow and the third fluid flow based on the determined modified flows.

In some embodiments, one or more methods as described herein may include maintaining the difference between the determined percentages and the pre-selected percentages within a pre-selected error range. For example, in some embodiments, the pre-selected error range may be in the range of about 1.0% to −1.0%, about 0.5% to about −0.5%, about 0.25% to about −0.25%, about 0.1% to about −0.1%, or about 0.05% to about −0.05%, based on the pre-selected percentages.

In some embodiments, one or more methods as described herein may include determining a flow rate of the flow of the first fluid based on the signals received from the second tank flow meter, the third tank flow meter, and the booster flow meter. In some embodiments, pressures of the first fluid flow, second fluid flow, and third fluid flow may be about the same at the junction of blended fluid pipe. In some embodiments, one or more methods as described herein may include controlling at least one of a second flow control valve in fluid communication with the second fluid flow and a third flow control valve in fluid communication with the third fluid flow to thereby control at least one of the second fluid flow and the third fluid flow based on the determined modified flows. In some embodiments, one or more methods as described herein may include controlling a second flow control valve in fluid communication with the second fluid flow and a third flow control valve in fluid communication with the third fluid flow to thereby maintain pressure at each of the second tank flow meter and the third tank flow meter between about 15 psi and about 25 psi.

Figure 6A:
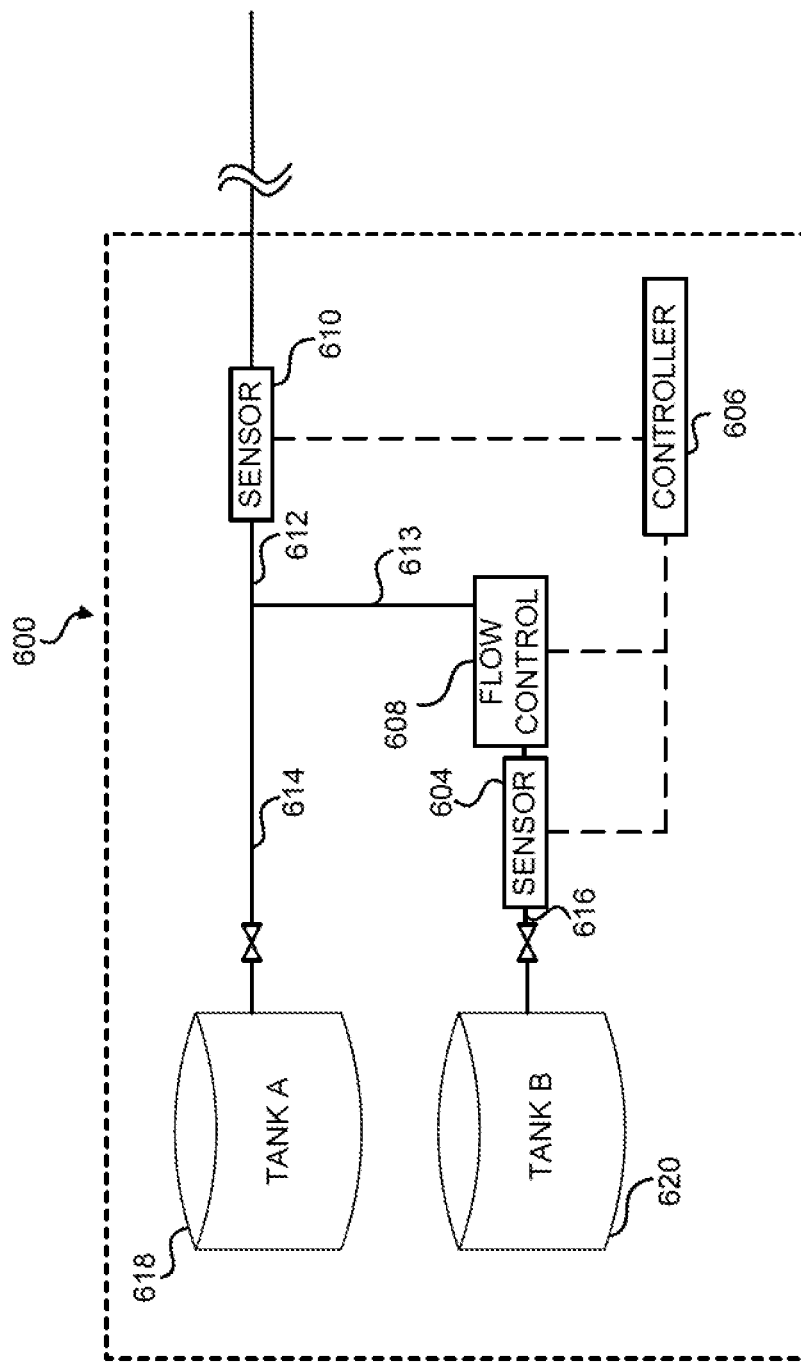
FIGS. 6A through 6B are schematic diagrams of a two-component in-line mixing system positioned at a tank farm to admix two hydrocarbon liquids from separate tanks into a single pipeline according to an embodiment of the disclosure.
Figure 6B:
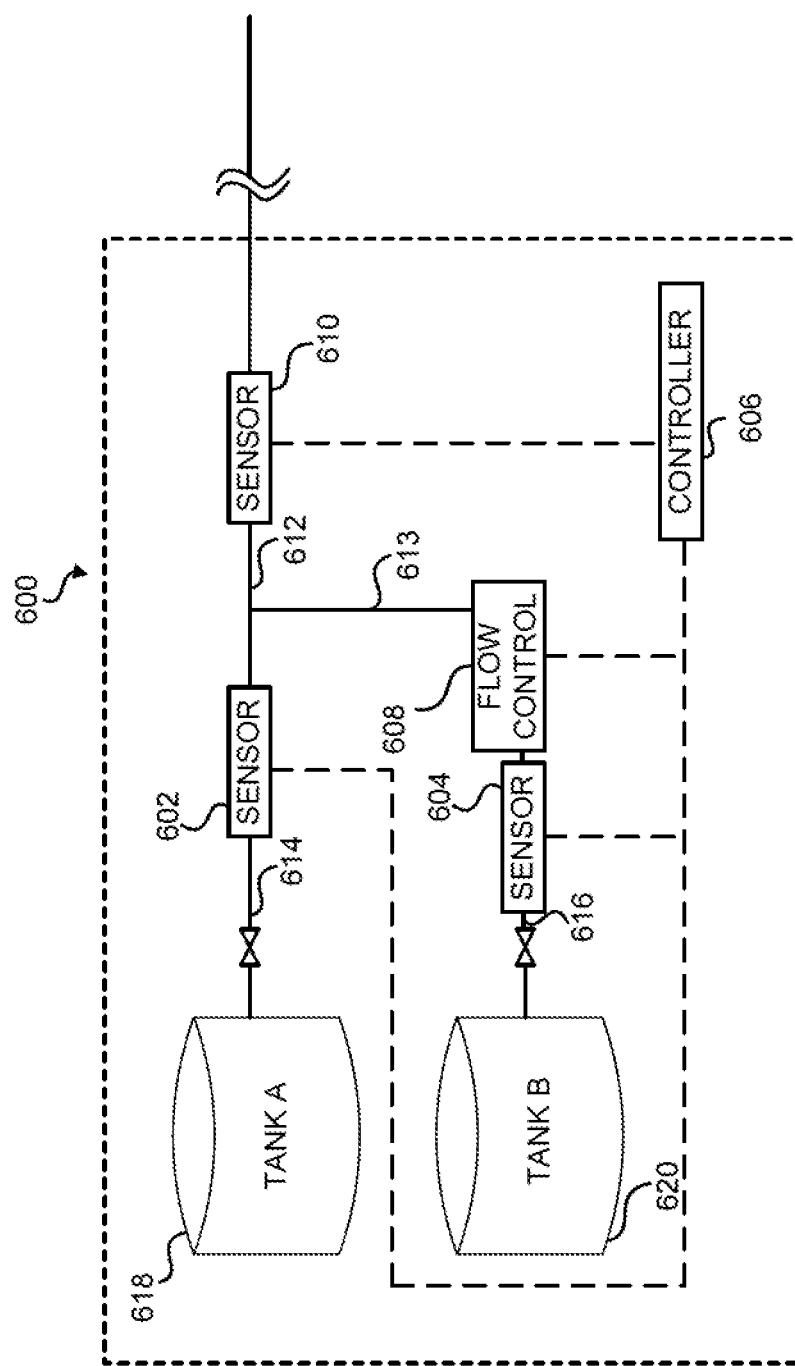

FIGS. 6A through 6B are schematic diagrams of a two-component in-line mixing system positioned at a tank farm to admix two hydrocarbon liquids from separate tanks into a single pipeline according to an embodiment of the disclosure. The in-line mixing system 600 may include two tanks (e.g., tank A 618 and tank B 620), three tanks, or more tanks, as noted above. Tank A 618 may store a less dense or denser liquid than that of the liquid stored in tank B 620, depending on the final blend (in other words, Tank A 618 may store a liquid of a different density than that of tank B 620). Each tank (e.g., tank A 618 and tank B 620) may include or be connected to and in fluid communication with output pipes (e.g., a first output pipe 614 and a second output pipe 616, respectively). Output pipe 614 may attach directly to a blend pipe 612. The flow of liquid stored in tank A 618 through the output pipe 614 may be gravity based or gravity-fed, as described above. Such a flow may be affected by the diameter of the output pipe 614 (e.g., smaller diameter pipes may increase pressure while decreasing flow and larger diameter pipes may decrease pressure while increasing flow). In an embodiment, output pipe 616 may be connected to and in fluid communication with a flow control device 608 (also referred to as a mechanical flow controller, a flow control apparatus, and/or flow control subsystem). In an example, a sensor 604 may be connected to and/or in fluid communication with either the output pipe 616, the flow control device 608, or tank 620. Further, the flow control device 608 may include sensors (e.g., the sensors including the functionality of sensor 604 and/or other functionality, such as the capability to provide a flow rate, pressure, and/or other variables of the in-line mixing system 600). The flow control device 608 may further be connected to and in fluid communication with a mixing pipe 613. The mixing pipe 613 and first output pipe 614 may be connected to and in fluid communication with a blend pipe 612. The blend pipe 612 may admix or mix the liquid flowing from tank A 618 and tank B 620 (e.g., a first liquid and second liquid, respectively) during a blending operation. A sensor 602, as illustrated in FIG. 6B, may be connected to and/or in fluid communication with the output pipe 614. A sensor 610 may be connected to and/or in fluid communication with the blend pipe 612. The sensor 602 and sensor 610 may be the same type of sensor as sensor 604.

In an example, a blending or mixing process or operation may include two or more liquids (e.g., the liquid stored in tank A 618 and tank B 620). The two or more liquids may be hydrocarbon liquids (e.g., petroleum liquids and/or renewable liquids). The density or gravity may or may not be known based on various configurations of the tank farm. For example, upon delivery of a liquid, a user may receive the density or gravity or an estimate density or gravity, based on the type of liquid and/or on a form or ticket. In another example, the liquid delivered to a tank may be of a certain type (i.e., heavy blend crude oil, light blend crude oil, other types of hydrocarbon liquids, and/or renewable liquids) and may be associated with an estimated density or gravity (e.g., for a heavy blend crude oil an API of about 30 degrees or less and for a light blend crude oil an API of higher than 30 degrees). In another example, one density or gravity may be unknown (e.g., a particular tank or pipe may not include a sensor or meter, such as tank A 618 or output pipe 614 in FIG. 6A), while all or some other densities or gravities may be known or measured based on various sensors or meters disposed throughout the in-line mixing system 600 (e.g., sensor 604). In another example, when a density or gravity is unknown, a sensor or meter (e.g., sensor 602 and/or sensor 604 and sensor 610) may be utilized to determine another density or gravity and, based on the other density or gravity (for example, the density or gravity of the second liquid and the blend liquid), the controller 606 may determine the unknown density or gravity. Such sensors or meters may be in signal communication with the controller 606. As noted, approximate, but inexact, densities or gravities may be known. In another example, the densities or gravities of all liquids to be blended may be measured via sensors or meters.

As used herein, "signal communication" refers to electric communication such as hard wiring two components together or wireless communication, as understood by those skilled in the art. For example, wireless communication may be Wi-Fi®, Bluetooth®, ZigBee, forms of near field communications, or other wireless communication methods as will be understood by those skilled in the art. In addition, signal communication may include one or more intermediate controllers, relays, or switches disposed between elements that are in signal communication with one another.

In an example, the sensors (e.g., sensor 602, sensor 604, and other sensors as will be described below) may be hydrometers, gravitometers, densitometers, density measuring sensors, gravity measuring sensors, pressure transducers, flow meters, mass flow meters, Coriolis meters, other measurement sensors to determine a density, gravity, or other variable as will be understood by those skilled in the art, or some combination thereof. In such examples, the sensors may measure the density and/or gravity of a liquid, the flow of the liquid, and/or the pressure of the liquid. As noted above, the controller 606 may be in signal communication with the sensors or meters. The controller 606 may poll or request data from the sensors at various points in a blending operation. While a variety of sensors may be utilized, a hydrometer may be preferred as, typically, hydrocarbon products are characterized by API gravity and a hydrometer may measure the specific gravity of a liquid. Thus, the controller 606 may convert an input API gravity once to specific gravity for further determinations and/or calculations. A mass flow meter or Coriolis meter may also be preferred, as such meters may measure flow and density. While such meters may potentially require conversion of density to gravity, the use of such meters may reduce the total amount of equipment to use. Further, the sensor or meter may be in fluid communication with a liquid to measure the density or gravity or may indirectly measure density or gravity (e.g., an ultrasonic sensor). In other words, the sensor or meter may be a clamp-on device to measure flow and/or density indirectly (such as via ultrasound passed through the pipe to the liquid).

As noted above, the sensors (sensor 602, sensor 604, and other) may measure the density or gravity of a liquid and/or a user may enter or the controller 606 may store a density or gravity. The controller 606 may be configured to perform the determination or calculations described herein based on either density, gravity, specific gravity, or API gravity. The controller 606 may be configured to convert any given measurement based on the type of determinations or calculations (e.g., determinations or calculations based on density, gravity, specific gravity, or API gravity). For example, a user may enter an API gravity for a liquid at a user interface in signal communication with the controller. 606. The controller 606, may convert the entered API gravity to a specific gravity. In such examples, the sensors disposed throughout the system may measure the gravity of other liquids. In another example, the sensors may provide different measurements, e.g., density, and the controller 606 may further convert those measurements to gravity. In another example, the controller 606 may convert the entered API gravity to density. In such examples, the sensors disposed throughout the system may measure the density of other liquids. In another example, the sensors may provide different measurements, e.g., gravity, and the controller 606 may further convert those measurements to density.

As noted, the in-line mixing system 600 may perform various blending or mixing operations or processes. Rather than base control of the flow control device 608 on just the flow and/or mix ratio of the liquids to be blended, the in-line mixing system 600 may base control of the flow control device 608 on the density or gravity of the liquids to be blended and a target blend density or gravity (in other words, the target density or gravity, being a density or gravity that may be sought or desired for the final blend, may be utilized, rather than utilization of just a mix ratio and/or flow of liquids to be blended). As noted, various liquids may be blended via the blend pipe 612. Further, one or more densities or gravities of liquids to be blended (e.g., the density or gravity of liquid stored in tank B 620) may be known or measured and another unknown (e.g., the density or gravity of liquid stored in tank A 618). As the blending or mixing operation or process starts, the controller 606 may determine or obtain a density or gravity from any available sensors of the in-line mixing system 600 (e.g., from sensor 604, sensor 610, and, if available, sensor 602) or from an input (e.g., via a user interface). Based on the density or gravity obtained from the sensors (e.g., sensor 604 and sensor 610), the controller 606 may determine the density or gravity of the liquid of unknown density. As noted, sensors (e.g., sensor 604, sensor 610, and, if present, sensor 602) may be disposed throughout the in-line mixing system 600 or included in flow control devices to measure all densities.

In the blending or mixing operation or process, a blend may be blended to a target blend density or gravity. In other words, the blending or mixing operation or process may be based on a target blend density or gravity. A target blend density or gravity may be set or preset (in other words, loaded into or stored in) in the controller 606. The target blend density or gravity may be set via a user interface in signal communication with the controller 606. For example, a user may set the target blend density or gravity at the user interface and the user interface may send or transmit the target blend density or gravity to the controller 606. In another example, the target blend density or gravity may be determined based on a particular or specified end product or blend. For example, a blending or mixing operation or process may be set to blend a high-volatile bituminous mixture or blend. In such a blend, an ideal or target blend density or gravity may be an API gravity of about 30 degrees. In such examples, the end product or blend (e.g., the high-volatile bituminous mixture or blend) API gravity may be included in or preset in the controller 606. In another example, a user interface may include a selectable list of various options for end products or blends. Based on the selected end product or blend, a target blend density or gravity may be set for a blending or mixing operation or process.

As the blending or mixing operation or process is initiated, the controller 606 may obtain or determine the density or gravity from each of the tanks (e.g., tank A 618 and tank B 620) at the tank farm. The controller 606 may further include, determine, or obtain an initial mix ratio and/or flow rate for any flow control devices in the in-line mixing system 600 (e.g., flow control device 608). In an example, the density or gravity of each liquid to be blended may be a known value. Further and as noted above, the density or gravity of each liquid to be blended may be entered into the user interface and sent or transmitted to the controller 606. In another example, each tank (e.g., tank A 618 and tank B 620) may include sensors or meters (for example, sensor 602 and sensor 604). In other examples, sensors or meters (e.g., sensor 602 and sensor 604) may be disposed on or added onto the pipe (e.g., the first output pipe 614 and second output pipe 616). For example, the sensors or meters may be clamp-on sensors or may be integrated into or onto the pipe or components of the pipe (such as a pump or flow control valve, as described above). In such examples, prior to or just after the initiation of the blending or mixing operation or process, the controller 606 may determine or obtain the density or gravity measurements of the liquids to be blended from the sensors or meters (or obtain the density or gravity measurements where such measurements may be stored, such as from another controller, sub-controller, or memory). The controller 606 may also obtain other data from the sensor or meters, such as flow rate, pressure, and/or other variables.

In yet other examples, one tank and pipeline associated with or corresponding to the tank may not include a sensor or meter (in other words, tank A 618 may or may not include a sensor 602). If a density or gravity of a liquid to be blended is unknown and no sensor is available to measure or determine the density or gravity, the controller 606 may determine the density or gravity based on the other determined or obtained densities or gravities, as well as the blend density or gravity obtained from sensor 610. For example, in FIG. 6A, a second density or gravity may be known or determinable (e.g., measurable via the sensor 604 or a meter). As such, the controller 606 may determine the second density or gravity. Further, the blended density or gravity may be determinable (as in, measureable via the sensor 610 or a meter). Yet further still, a ratio of the two liquids to be blended may be known (as in, the initial ratio of the liquids to be combined, such as a 50:50, 60:40, 30:70 mix ratio and so on or a mix ratio from 1:99 to 99:1). Based on the ratio and the determined densities or gravities, the unknown density of a first liquid (e.g., the liquid stored in tank A 618) may be determined, using, for example, the blended gravity as equal to the first ratio multiplied by the first density or gravity plus the second ratio multiplied by the second density or gravity (rearranged to solve for the first density or gravity or the unknown value), as shown by the following equations:

Blended Gravity =
$$\text{First Gravity} * \text{First Ratio} + \text{Second Gravity} * \text{Second Ratio}$$

$$\text{First Gravity} = \frac{\text{Blended Gravity} - \text{Second Gravity} * \text{Second Ratio}}{\text{First Ratio}}$$

If a first density or gravity is unknown, but the second density or gravity and blended density or gravity are known, the controller 606 may determine the first density or gravity. For example, if a synthetic fuel of a specific gravity of 0.857 is to be mixed with a heavier liquid at an initial mix ratio of 50:50, the controller 606 may determine the unknown specific gravity after measuring the blended gravity at the start of the blending operation, which may be, for example, 0.886. Utilizing the equations above, the controller 606 may determine that the specific gravity of the heavy liquid is 0.915 (e.g., ((0.886−50%)*0.857)/50%).

If all densities or gravities are known or once all densities or gravities have been determined, the flow of the liquids to be blended may be adjusted as needed or at specified time intervals, to produce an accurate and precise blend. The specified time interval may be an interval set by a user at the user interface. In another example, the specified time interval may be an interval set in the controller 606. In such examples, the specified time interval may be a constant value or a variable value (variable, for example, depending on known or unknown densities or gravities). A specified time interval may be an interval of 10 to 20 minutes. In such examples, the amount of specified time intervals may be based on the length of a specified time interval and the total length of the blending or mixing operation or process (e.g., a blend operation of 4 hours may include 12 to 24 specified time intervals of 10 to 20 minutes).

In another example, the specified time intervals may vary in length of time as the blending or mixing operation or process proceeds. For example, neither density or gravity of any of the tanks (e.g., tank A 618 and tank B 620) may be known, while in other examples, an estimate may be known (e.g., based on which liquid is heavy and which is light). In such examples, none of the tanks (e.g., tank A 618 and tank B 620) may include sensors or meter to determine densities or gravities, except for the sensor 610 to measure the blend density or gravity. Further, the controller 606 may check the blend density or gravity (via sensor 610), to allow for adjustment of the flow or mix ratio of liquids, more frequently near the beginning of the blending or mixing operation or process (e.g., at the first 30 minutes of the blending operation) to determine an accurate (e.g., if each density or gravity is unknown) or more accurate (e.g., if an estimate of one or more of the densities or gravities is known) estimate of each liquids density or gravity. The blend density or gravity may be checked or determined, for example, every 1 to 5 minutes or 1 to 10 minutes for the beginning (e.g., the first 30 minutes) of the blending or mixing operation or process and the flow rate or mix ratio adjusted. Such frequent measurements and adjustments may allow for the controller 606 to estimate the densities or gravities of each of the liquids to allow for further and less frequent adjustments during the blending or mixing operation or process, to ensure an accurate blend near (e.g., within about 1% of the target blend density or gravity) or at the target blend density or gravity. After such estimates are determined, the controller 606 may check blend density or gravity and adjust the flow rate or mix ratios of liquids less frequently (i.e., every 10 to 20 minutes), until the blending operation is finished.

At the end of each specified time interval, the controller 606 may determine the current density or gravity of the blend at the blend pipe 612. The controller 606 may then compare the current density or gravity to the target blend density or gravity. If there is a difference between the current density or gravity to the target blend density or gravity, the controller 606 may determine a corrected ratio of the first liquid and second liquid to reach the target blend density or gravity. Based on the corrected ratio, the controller 606 may adjust the flow, via a flow control device, of at least one of the liquids (e.g., the controller 606, via the flow control device 608, may adjust the flow rate of the second liquid from tank B 620, while maintaining the proper pressure).

In an embodiment the flow control device 608 may include a pump, a meter, a pressure transducer, a flow control valve, and/or some combination thereof. In another example, the sensor 604 may be a part of the flow control device 608. In another example, the sensor 604 may be included with or a part of the meter of the flow control device 608 (e.g., a Coriolis meter, to measure flow and density). In such examples, each component of the flow control device 608 may be in signal communication with the controller 606. The flow control device 608 may allow for mix ratio adjustments of the liquids being blended thereby to adjust the density or gravity. For example, the flow control device 608 may, as noted, include a flow control valve. The flow control valve may adjust the flow of the liquid based on opening or closing/pinching the flow control valve. In another example, the flow control device 608 may include a pump and variable speed drive. The variable speed drive may increase/decrease the speed of the pump to increase/decrease the flow rate of a liquid to adjust the ratio of liquids to be blended.

Figure 7A:
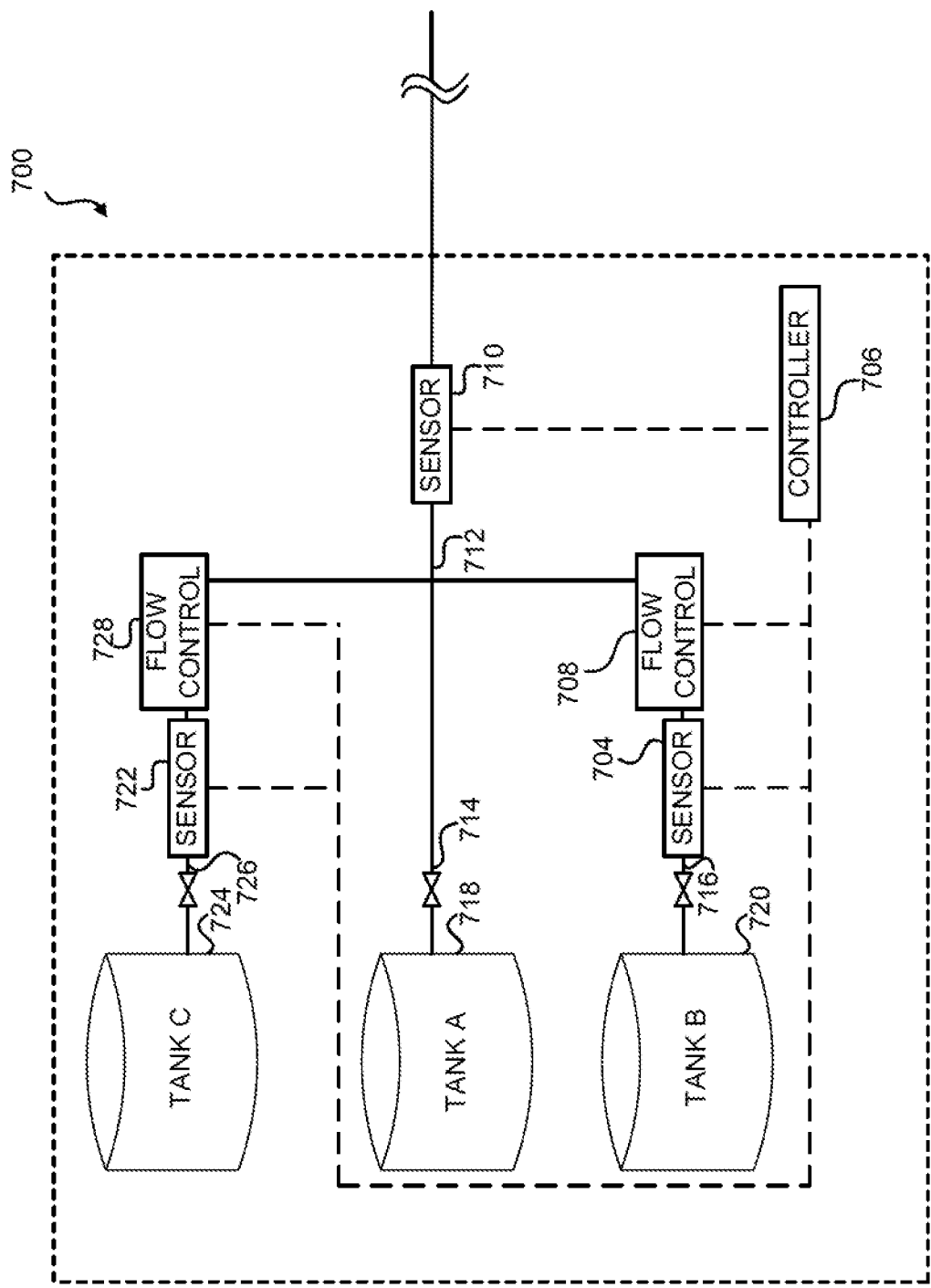
FIGS. 7A through 7B are schematic diagrams of a three-component in-line mixing system positioned at a tank farm to admix three hydrocarbon liquids from separate tanks into a single pipeline according to an embodiment of the disclosure.
Figure 7B:
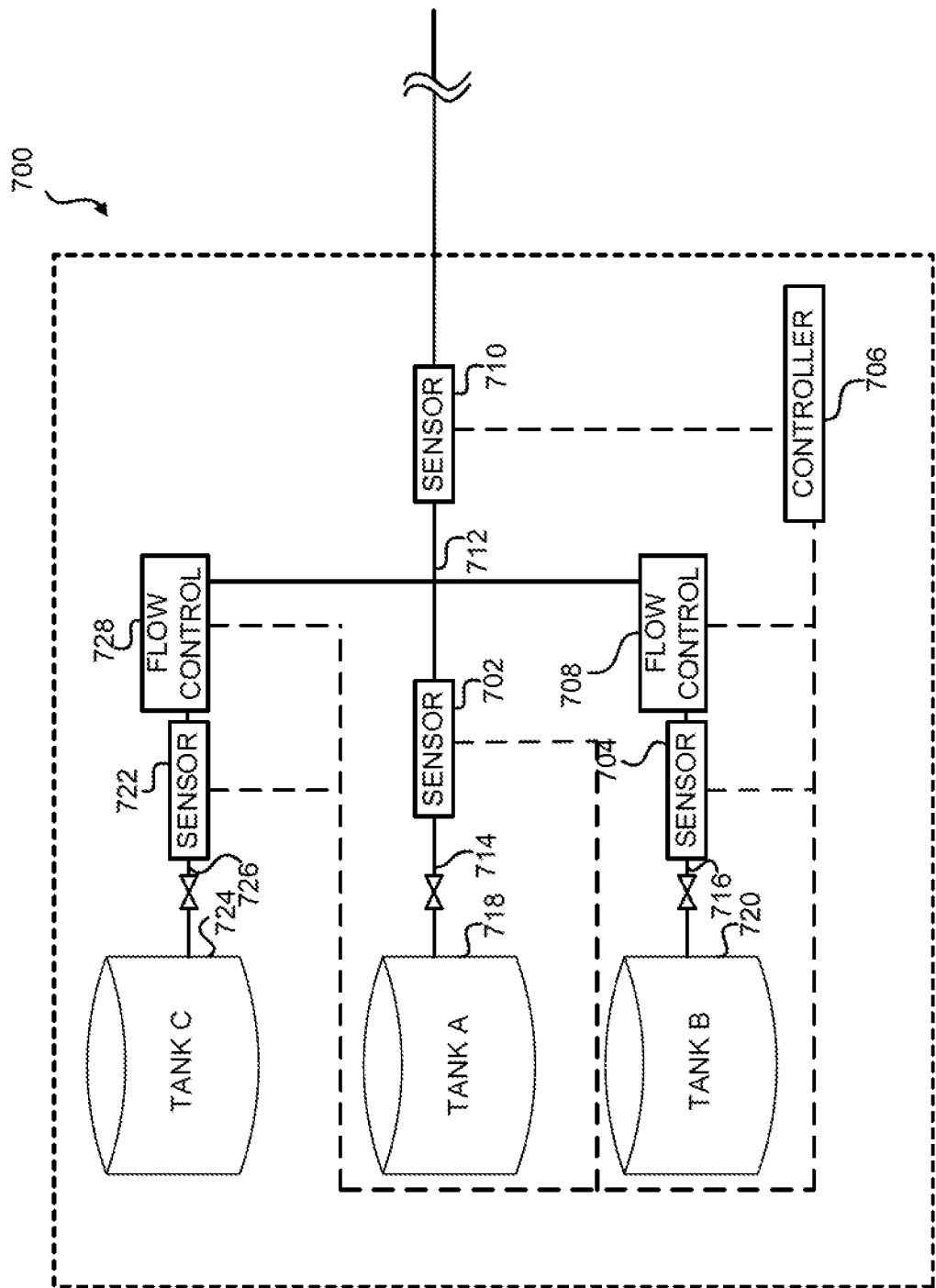

FIGS. 7A through 7B are schematic diagrams of a three-component in-line mixing system 700 positioned at a tank farm to admix three hydrocarbon liquids from separate tanks into a single pipeline according to an embodiment of the disclosure. As described above, a tank farm may include two or more tanks (e.g., tank A 718, tank B 720, and tank 724). In such examples, the tank farm may include extensive piping, as well as numerous other components, such as flow control devices 708, 728, various sensors 702, 704, 710, 722, and a controller 706. In such examples, a blending or mixing operation or process may include at least two of the tanks or all three tanks. In such operations or processes, various initial ratios may be utilized (e.g., 50:45:5, 60:30:10, and so on). Further, a blend may be based on target blend density or gravity (the ratio determined based on the desired blend density or gravity). In such examples, once all the densities or gravities are gathered, the controller 706 may determine the actual blend density or gravity, via the sensor 710 at the blend pipe 712. Based on the target blend density or gravity compared to the actual blend density or gravity, as well as the current liquid ratio and/or a target ratio, the controller 706 may adjust the flow of one or more of the liquids in the blend while the blending or mixing operation or process occurs.

Figure 8A:
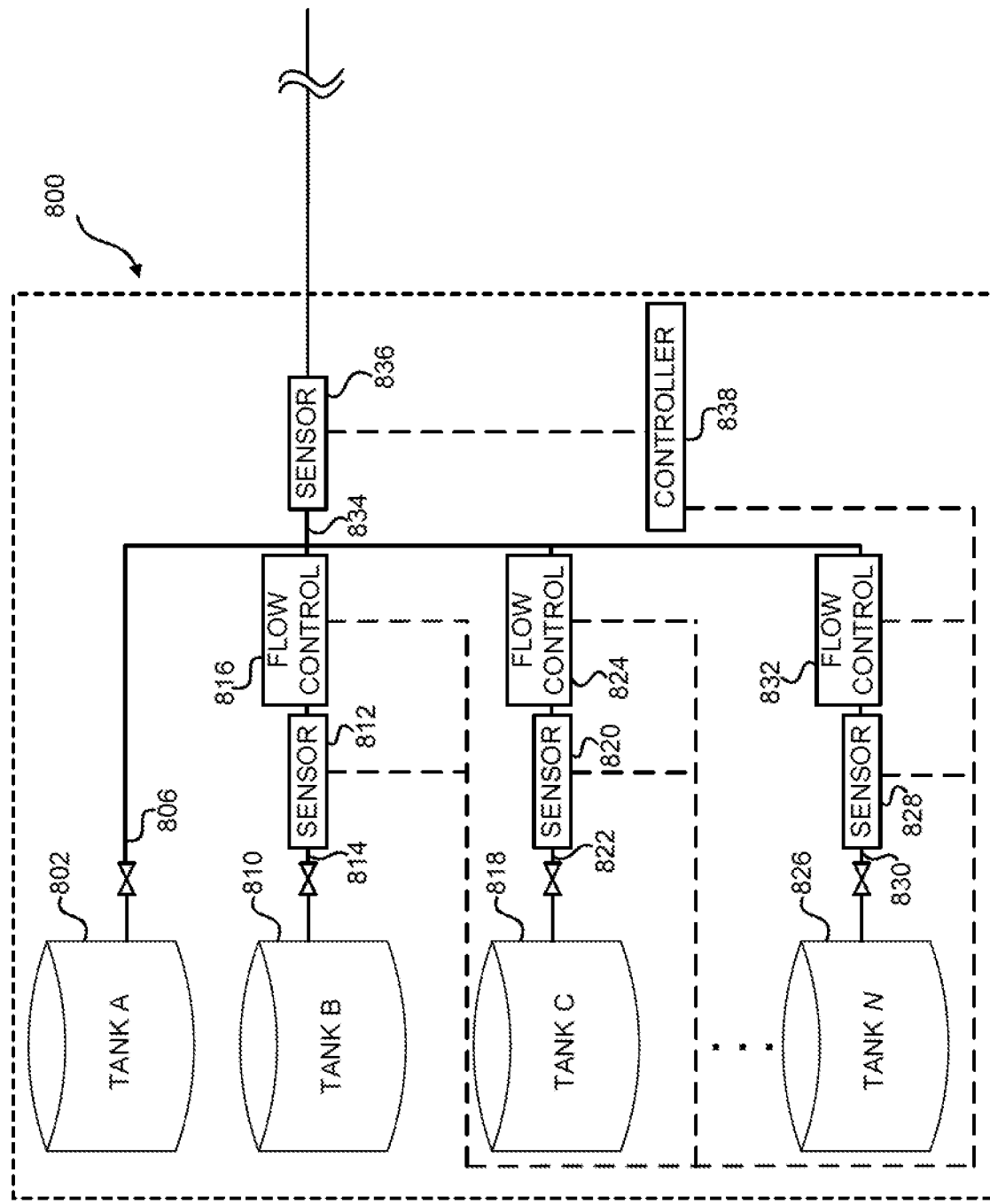
FIGS. 8A through 8B are schematic diagrams of a multi-component in-line mixing system positioned at a tank farm to admix two or more hydrocarbon liquids from separate tanks into a single pipeline according to an embodiment of the disclosure.
Figure 8B:
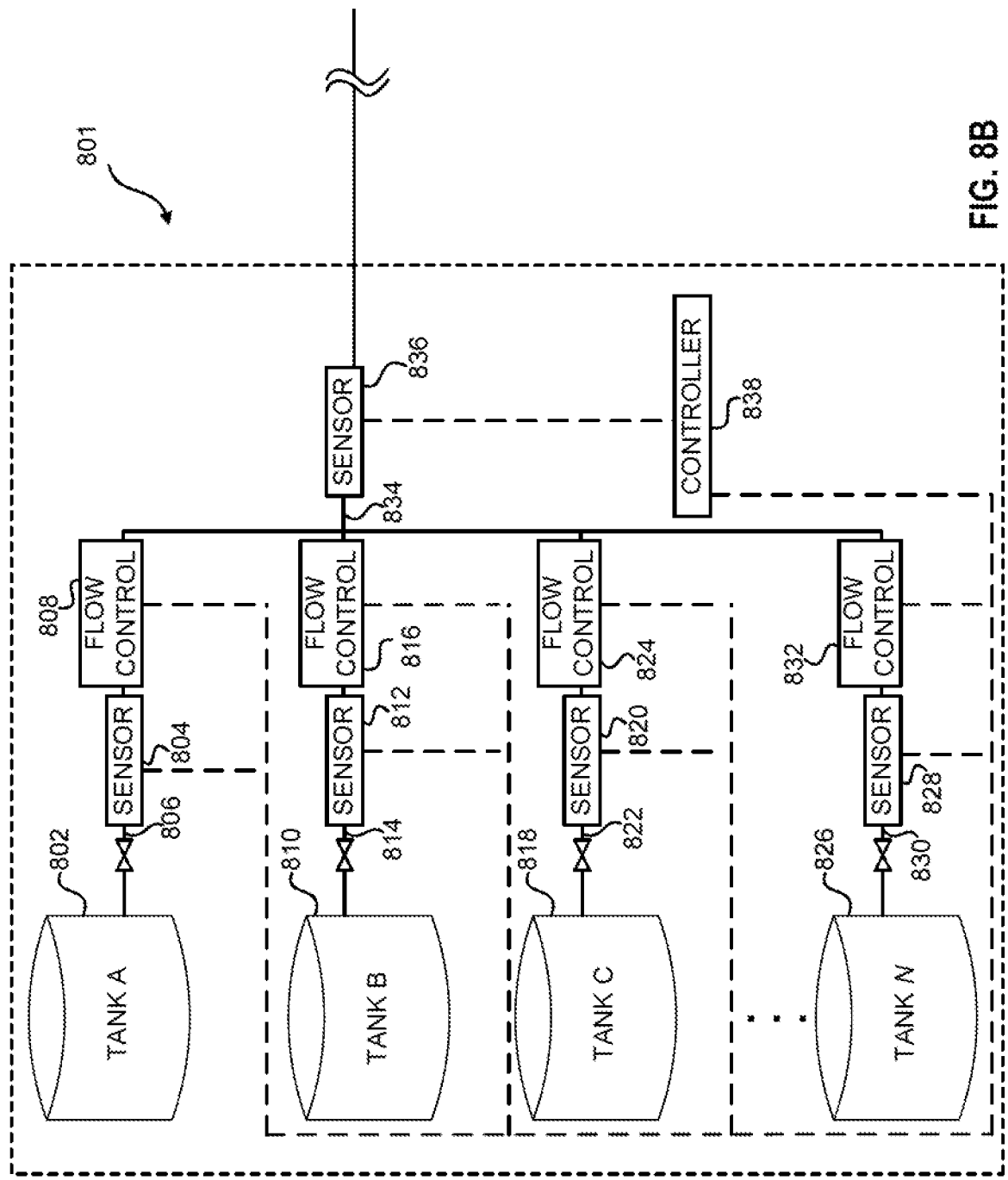

FIGS. 8A through 8B are schematic diagrams of a multi-component in-line mixing system 800 positioned at a tank farm to admix two or more hydrocarbon liquids from separate tanks into a single pipeline according to an embodiment of the disclosure. In such examples, the tank farm may include any number of tanks (e.g., tank A 802, tank B 810, and tank C 818 to tank N 826) to store various liquids for various blending operations. In such examples, different tanks may be used for different blending operations. In other words, two or more tanks may be active at a time, while other tanks may be de-active (as in, not utilized in a blending operation). Such tanks may store particular liquids not utilized for specific blends or may be empty at that particular point in time. Thus, various amounts of liquids may be blended in such a tank farm (from 3 component blending to 5 component blending or more).

As noted, the tank farm may include various components and some tanks may utilize the same components (as in, tank B 810 when active may use a set of components, while tank C 818 remains de-active and tank C 818 may use the same set of components, while tank B 810 remains de-active). The components utilized at the tank farm may include flow control devices 816, 824, 832, various sensors 804, 812, 820, 828, 836, and a controller 838.

Figure 9:
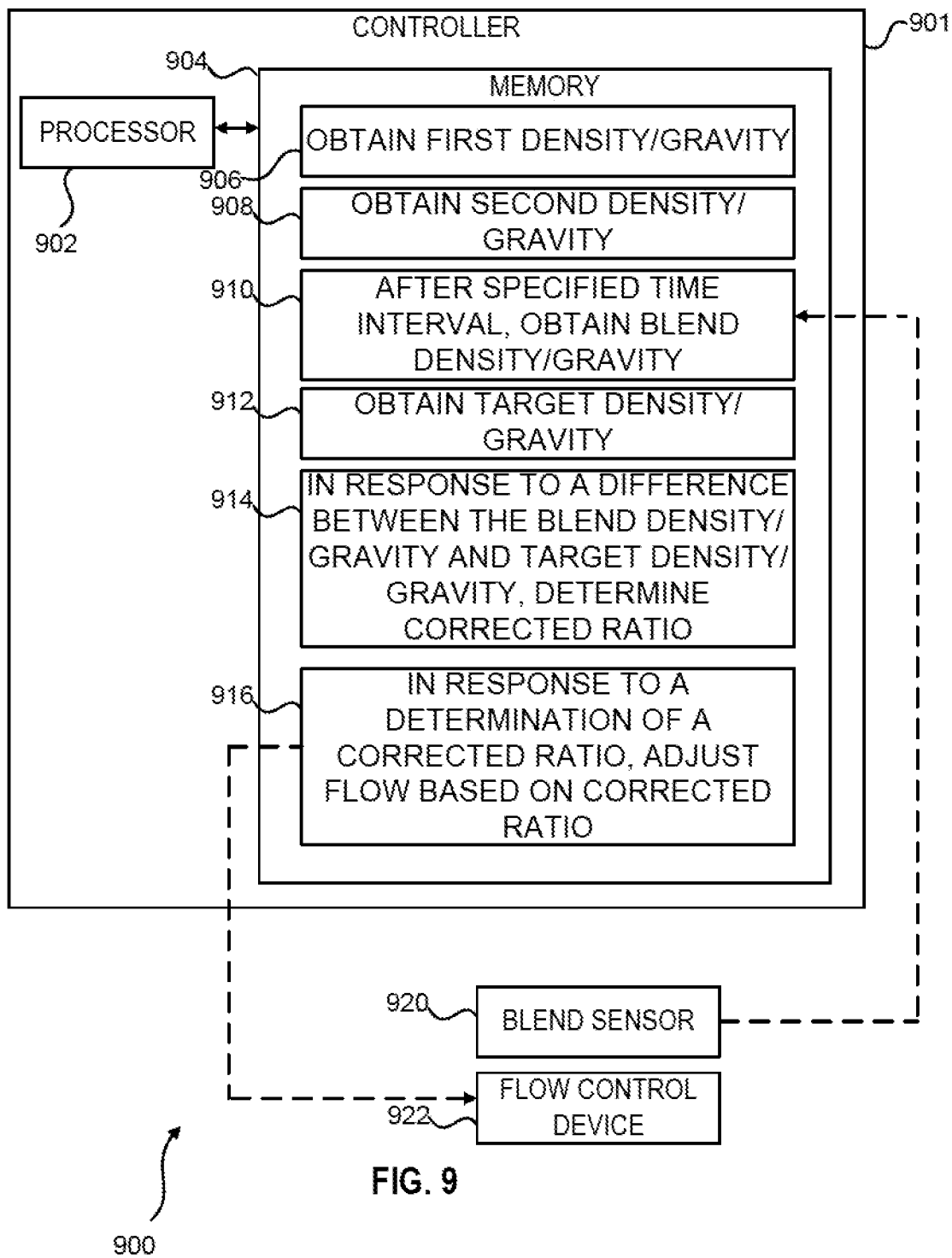
FIG. 9 is a simplified diagram illustrating a control system for managing a multi-component in-line mixing system according to an embodiment of the disclosure.

FIG. 9 is a simplified diagram illustrating a control system for managing a multi-component in-line mixing system according to an embodiment of the disclosure. The control system, as described herein, may be a controller 901, one or more controllers, a PLC, a SCADA system, a computing device, and/or other components to manage a blending operation. The controller 901 may include one or more processors (e.g., processor 902) to execute instructions stored in memory 904. In an example, the memory 904 may be a machine-readable storage medium. As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory 904 may store or include instructions executable by the processor 902. As used herein, a "processor" may include, for example one processor or multiple processors included in a single device or distributed across multiple computing devices. The processor 902 may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

The instructions may include an instruction 906 to obtain or determine a first density or gravity. In such examples, at the beginning of or prior to start of a blending operation, the controller 901 may obtain the first density or gravity from a user (e.g., the density or gravity entered via a user interface). In another example, the controller 901 may obtain the first density or gravity from a sensor. The controller 901 may obtain the first density or gravity from a ticket or order slip (or another form including such data). In another example, the controller 901 may determine the density or gravity based on other known densities or gravities. The controller 901 may include the first density or gravity as a preset value. In such examples, a particular tank may be store the same liquid for each blending operation. As such, the density or gravity of the liquid may be the same or slightly different per batch. The instructions may include an instruction 908 to obtain a second density or gravity, similar to that of or the same as instructions 906. In other words, the second density or gravity may be obtained via a user at a user interface, via measurement (as in, measurement from a sensor), via determination based on other measurements and/or data, or via a preset density or gravity.

The instructions may include an instruction 910 to obtain a target blend density or gravity. Such a target blend density or gravity may be determined based on the product to be blended or mixed. In another example, the target blend density or gravity may be based on user input via a user interface. In yet another example, the target blend density or gravity may be preset or stored in the memory 904 of the controller 901. The instructions may include an instruction 910 to, after a specified time interval, obtain or determine the actual blend density or gravity. Such instructions 910 may determine the actual blend density or gravity based on a measurement from a blend sensor 920.

After reception of the actual blend density or gravity, the controller 901 may compare the actual blend density or gravity to the target blend density or gravity. The instructions may include an instruction 914 to, based on a difference between the actual blend density or gravity and the target blend density or gravity, determine a corrected ratio. In other words, the corrected ratio may be the mix ratio of the first and second liquid (or any other liquids to be blended) transported to a blend pipe for mixing.

The instructions may include instructions 916 to, in response to a determination of a corrected ratio, adjust the flow of one or more of the liquids, based on the corrected ratio. Such adjustments may occur during operation or execution of the blending or mixing operation or process. For example and as noted, the target blend may be a 30 API bend. If at a current ratio of 60:40, the blend is currently at 25 API, the lighter of the two fluids flow rate may be increased to increase the API gravity of the overall blend (e.g., an increase from 60:40 to 50:50, 40:60, etc. to increase the API gravity).

For example, a blend may be a 60:40 (first liquid: second liquid) blend with a target of an API of 30 degrees. In such examples, the first liquid, which may be a heavier liquid, may be fed via gravity to the blending pipe at a constant flow and pressure and the second liquid, which may be a lighter liquid, may be fed to the blend pipe, via a flow control device 922, at a set flow and/or pressure. At the beginning of such a blending operation, the current or actual blend API may be 28 degrees. Based on the difference between the target blend gravity and the actual blend gravity and the new determined ratio, the flow control device 922 may increase the flow of the second liquid during the blending operation, thus adjusting the mix ratio or increasing the ratio of the second liquid in the blend to ensure that the API is increased, so as to reach the target API. Such operations may ensure an accurate blend that meets the target blend density or gravity.

Other instructions may include instructions to obtain a current flow rate and/or mix ratio based on data obtained from the flow control device 922 and/or the blend sensor 920. Further, at the initiation of a blending operation the controller 901 may set the initial flow rate of liquids from each tank. The initial flow rate may be based on a known first density and second density, on an estimate of the first density and second density, or on an arbitrary mix ratio (e.g., an initial mix ratio may be 50:50 and, as such, the flow rate, via the flow control device 922, may be set to an appropriate setting to allow for the first liquid and second liquid to mix at the 50:50 ratio). In other examples, the flow rate of one liquid, e.g., the first liquid, may be a constant value, as the liquid may be gravity fed to the blend pipe. In such examples, the flow rate or mix ratio may be utilized to determine unknown densities or gravities.

Figure 10:
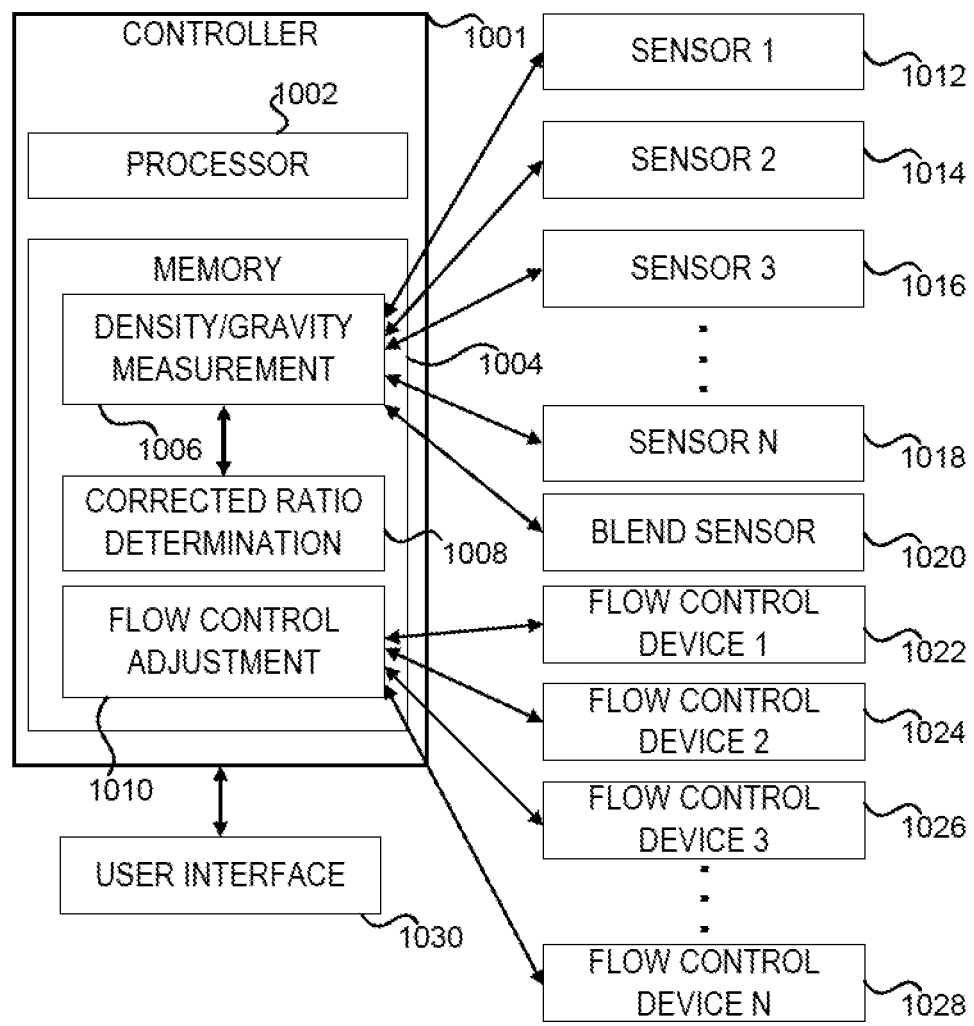
FIG. 10 is another simplified diagram illustrating a control system for managing a multi-component in-line mixing system according to an embodiment of the disclosure.

FIG. 10 is another simplified diagram illustrating a control system for managing a multi-component in-line mixing system according to an embodiment of the disclosure. In such examples, the controller 1001 may include instructions to measure or obtain a density or gravity from various sensors (e.g., blend sensor 1020, sensor 1012, sensor 1014, sensor 1016, sensor N 1018, etc.) or from a user interface 1030. Further, the controller 1001 may include instructions to determine a corrected ratio based on the determined or obtained densities or gravities. Further still, the controller 1001 may include instructions to adjust the flow and/or pressure of one or more of the various liquids being blended, via one or more flow control devices (e.g., flow control device 1022, flow control device 1024, flow control device 1026, flow control device N 1028, etc.), based on the determined or obtained densities or gravities. Such adjustments may occur during continuous operation of the blending or mixing operations or processes.

In an example, the sensors (e.g., blend sensor 1020, sensor 1012, sensor 1014, sensor 1016, sensor N 1018, etc.) may provide measurements as a density or as a gravity (e.g., a specific gravity). However, some values may be entered via the user interface as an API gravity. For example, if there are no sensors associated with a first tank or first output pipe, a user may enter the density or gravity of the first liquid at the user interface 1030. The user may enter such a value as an API gravity, which may typically be utilized to describe characteristics of hydrocarbon liquids. As such, the controller 1001 may include instructions to convert measurements, whether from density or specific gravity, to an API gravity or to convert an API gravity to a density or specific gravity. In another example, the user interface 1030 may include an option to select the type of measurement to enter when entering in a density or gravity (e.g., a list or drop-down list including measurements as density, specific gravity, or API gravity).

Figure 11:
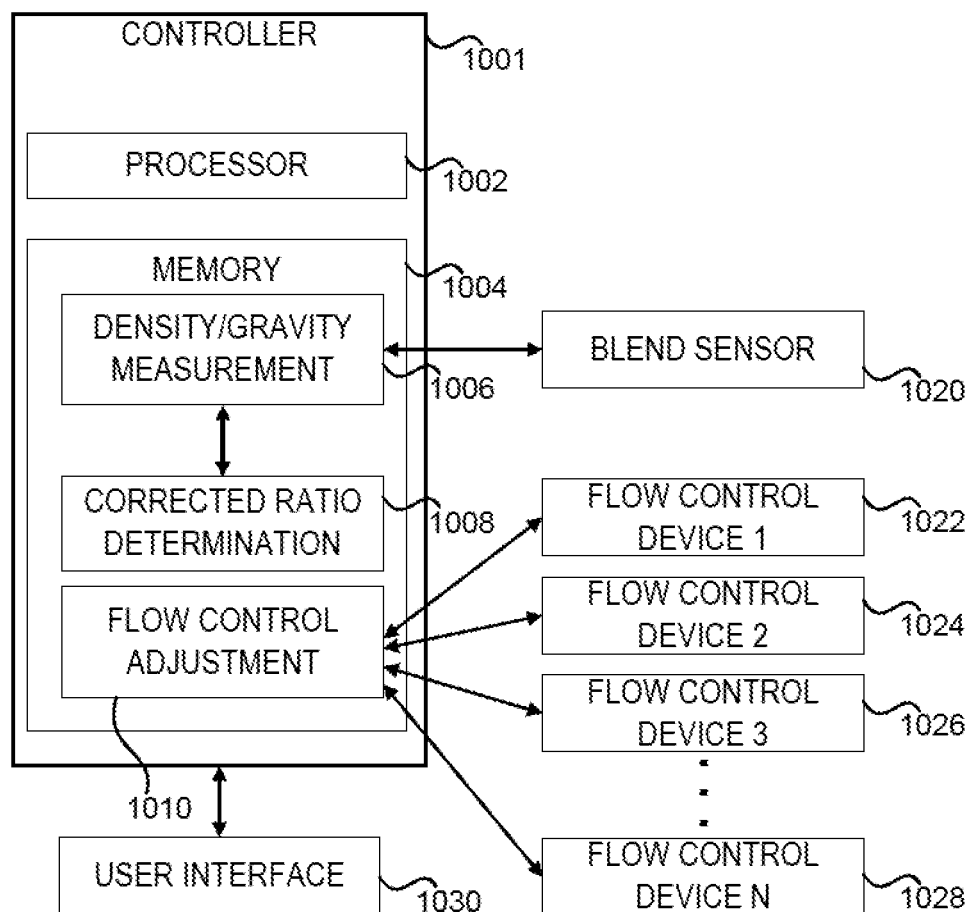
FIG. 11 is another simplified diagram illustrating a control system for managing a multi-component in-line mixing system according to an embodiment of the disclosure.

FIG. 11 is another simplified diagram illustrating a control system for managing a multi-component in-line mixing system according to an embodiment of the disclosure. As noted above, the controller 1001 may include instructions 1006 to measure or obtain the density or gravity of liquid associated with a corresponding sensor or meter (e.g., blend sensor 1020). In some cases, a tank farm may include a sensor (e.g., blend sensor 1020) corresponding to the blend pipe, rather than a sensor for the blend pipe and for each tank or pipe corresponding to each tank. In such cases, the density or gravity from each tank may be known, input at a user interface 1030, or be estimated as described above.

Figure 12:
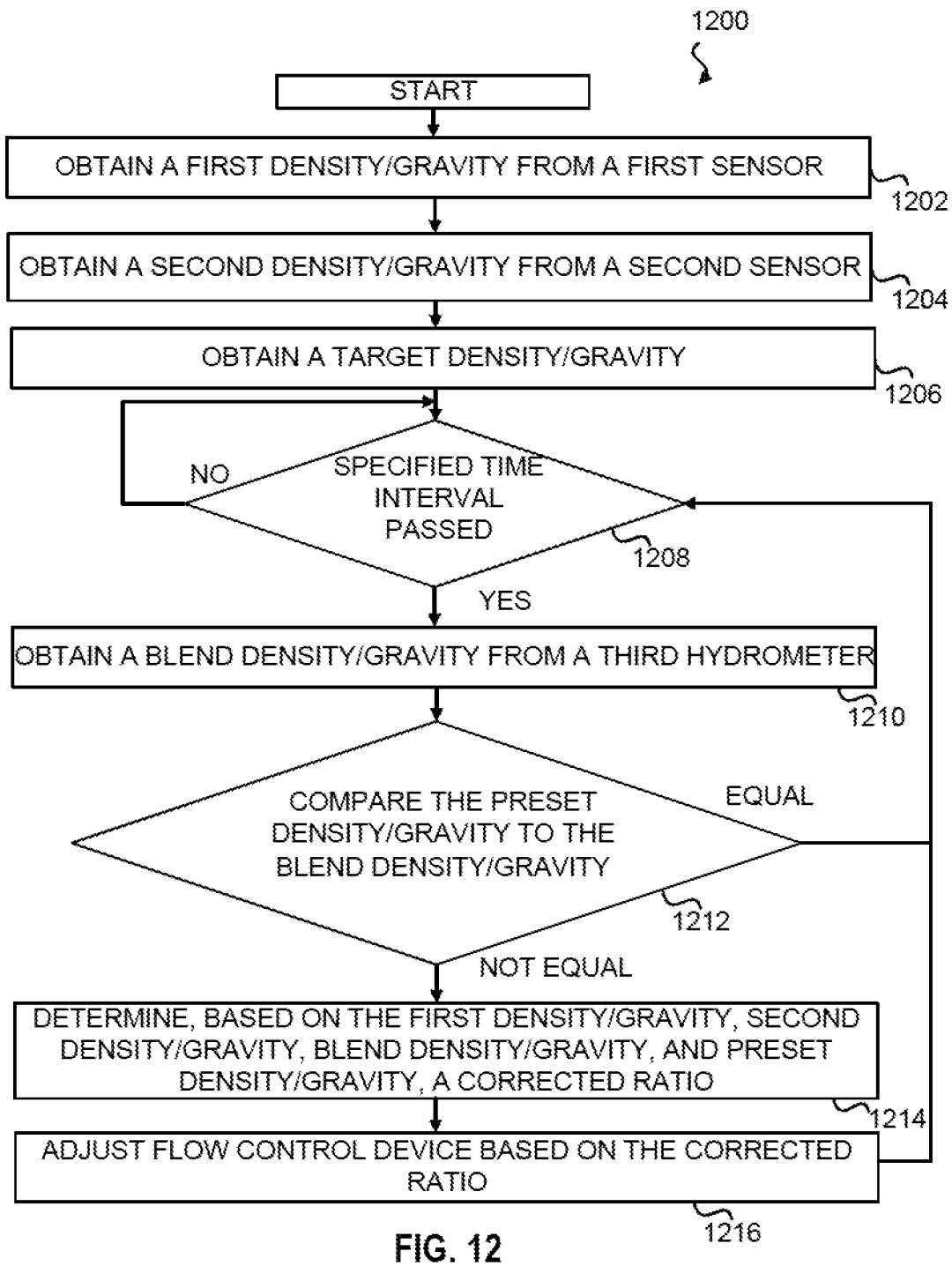
FIG. 12 is a flow diagram, implemented in a controller, for managing a multi-component in-line mixing system according to an embodiment of the disclosure.
Figure 13:
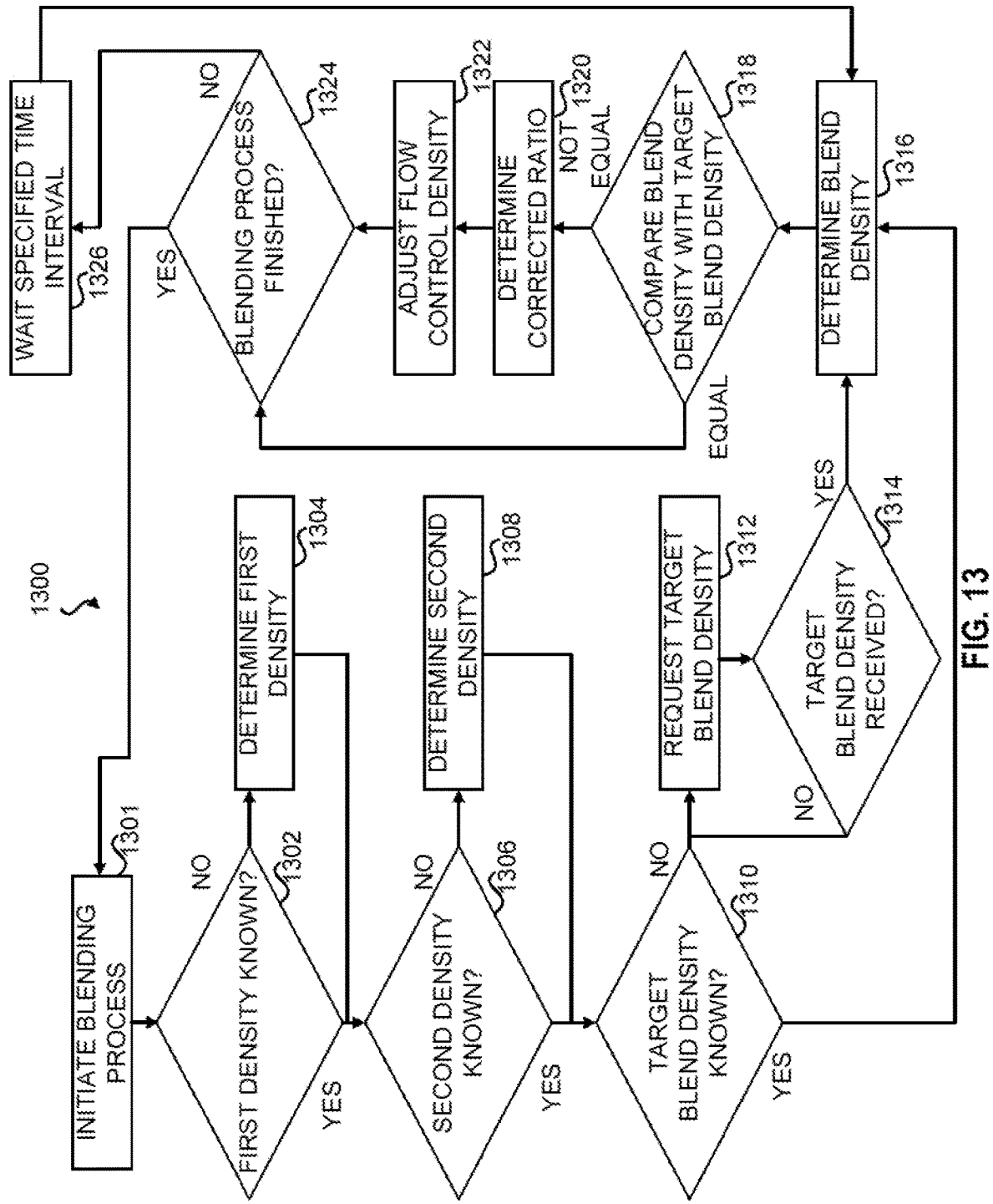
FIG. 13 is a flow diagram, implemented in a controller, for managing a multi-component in-line mixing system according to an embodiment of the disclosure.

FIGS. 12 through 13 are flow diagrams, implemented in a controller, for managing a multi-component in-line mixing system according to an embodiment of the disclosure. The method is detailed with reference to the controller 1001 and system 1000 of FIG. 10. Unless otherwise specified, the actions of methods 1200 and 1300 may be completed within the controller 1001. Specifically, methods 1200 and 1300 may be included in one or more programs, protocols, or instructions loaded into the memory of the controller 1001 and executed on the processor or one or more processors of the controller 1001. The order in which the operations are described is not intended to be construed as a limitation, and any number of the described blocks may be combined in any order and/or in parallel to implement the methods.

At block 1202, the controller 1001 may obtain or determine a first density or gravity from a first sensor 1012. In another example, the controller 1001 may obtain the first density or gravity from the user interface 1030 (e.g., based on an input from a user). In another example, the first density or gravity may be determined based on other known or determined densities or gravities. At block 1204, the controller 1001 may obtain or determine a second density or gravity from a second sensor 1014 (similar to that of obtaining or determining the first density or gravity from the first sensor 1012). In other examples, more densities or gravities, based on other liquids to be blended in a blending or mixing operation or process, may be obtained from other sensors located or disposed at the tank farm (e.g., a third sensor 1016, sensor N 1018, etc.).

At block 1206, a target blend density or gravity may be obtained. In such examples, the target blend density or gravity may be input at the user interface 1030. The target blend density or gravity may be preset and stored in memory 1004. At block 1208, the controller 1001 may determine whether a specified time interval has passed. If the specified time interval has not passed, the controller 1001 may continue to check whether the specified time interval has passed after a certain period of time. If the specified time interval has passed, the controller 1001 may obtain an actual blend density or gravity from a third sensor (e.g., blend sensor 1020) located at the blend pipe. The actual blend density or gravity may be the density or gravity of a blended liquid comprised of a ratio of the first liquid, the second liquid, and/or other liquids included in the blend operation.

At block 1212 the controller 1001 may compare the target density or gravity to the actual blend density or gravity. If the target blend density or gravity is equal to the actual blend density or gravity, the controller 1001 may wait for the next specified time interval to pass. If the values are not equal, at block 1214, the controller 1001 may determine a corrected ratio, based on the densities or gravities of each liquid being blended, the target blend density or gravity, and the actual blend density or gravity. In another example, prior to determination of a corrected ratio the controller 1001 may convert any number of measurements to different types of measurements, depending on controller 1001 configuration and/or measurements obtained from sensors disposed throughout the system. For example, the controller 1001 may be configured to determine a corrected ratio based on gravity, while the sensors may measure density. In such examples, the controller 1001 may be configured to convert the densities measured to gravities, prior to either comparison or determination of the corrected ratio. In another example, the controller 1001 may be configured to determine a corrected ratio based on density, while the sensors may measure gravity. In such examples, the controller 1001 may be configured to convert the gravities measured to densities, prior to either comparison or determination of the corrected ratio. In another example, the controller 1001 may be reconfigured to perform determinations or calculations based on the measurements performed by the sensors. In other words, a controller 1001 may be reconfigured to perform determinations based on density or gravity if the sensors measure density or gravity, respectively.

At block 1216, the controller 1001 may adjust the flow, via the flow control device of either the first liquid and second liquid (e.g., via flow control device 1022 and flow control device 1024, respectively), the second liquid (e.g., via the flow control device 1024), other liquids being blended (e.g., flow control device 1026, flow control device 1028, etc.), or a combination thereof.

For example, a first liquid from a first tank may be gravity-fed to the blend pipe. In such examples, the flow control device for the second liquid of the second tank may adjust the flow of the second liquid, thus controlling or adjusting the mix ratio of the first liquid and second liquid. Similar to the equations noted above, the new ratio may be calculated based on the first liquid's density or gravity, the second liquid's density or gravity, the actual blend density or gravity, and the target blend density or gravity. The following equation may be utilized to determine the corrected ratio (while the equation is shown utilizing gravity, density or API gravity may be utilized):

$$\text{Second Ratio} = \frac{\text{Target Blend Gravity} - \text{First Gravity}}{\text{First Gravity} - \text{Second Gravity}}$$

Based on the new second ratio, the flow control device may adjust the flow of the second liquid. In other examples, both the first liquid and second liquid may pass through a flow control device. In such examples, the first liquid flow and the second liquid flow may both be adjusted. While the equation described above is based on a two component blend, the equation may be utilized for a three or more component blend.

For FIG. 13, at block 1301, the controller 1001 may initiate a blending process or receive a signal to initiate a blending process. In such examples, the controller 1001 may not begin the actual blending process until a first density or gravity and a second density or gravity are determined. In another example, the controller 1001 may start the blending process upon reception of the initiation signal or indicator and determine the first and second densities or gravities as the blending process occurs.

At block 1302, the controller 1001 may determine whether a first density or gravity of a first liquid from a first tank is known. If the first density or gravity is unknown, at block 1304, the controller 1001 may determine the first density or gravity (e.g., via sensor, via the equations referenced above, or via a user interface 1030). At block 1306, the controller 1001 may determine if a second density or gravity of a second liquid from a second tank is known. If the second density or gravity is unknown, at block 1308, the controller 1001 may determine the second density or gravity (e.g., via sensor, via the equations referenced above, or via a user interface 1030).

At block 1310, the controller 1001 may determine whether the target blend density or gravity is known. If the target blend density or gravity is unknown, the controller 1001, at block 1312, may request the target blend density or gravity from a user (e.g., sending a prompt to a user interface indicating a target blend density or gravity may be entered to proceed). At 1314, if the target blend density or gravity has not been received the controller 1001 may wait for the target blend density or gravity. If the target blend density or gravity is received, the controller 1001, at block 1316, may determine the actual blend density or gravity, the blend density or gravity based on the density or gravity of the first and second liquid and the ratio the first and second liquid are blended or mixed at.

At block 1318, the controller 1001 may compare the blend density or gravity with the target blend density or gravity. If the blend density or gravity and the target blend density or gravity do not match, at block 1320 the controller 1001 may determine the corrected ratio, based on the density or gravity of the first liquid, the second liquid, the blended liquid, and the ratio of the first liquid and second liquid. At block 1322, the controller 1001 may adjust any flow control devices present to adjust the flow of one or more of the liquids to be blended or mixed.

At block 1324, the controller 1001 may determine whether the blending process is finished. If the blending process is finished, the controller 1001, at block 1326 may wait a specified time period and then determine the blend density again. Once the blending process is finished, the controller 1001 may initiate another blending process.

EXPERIMENTAL

Experiments were conducted to test two-component and three-component in-line mixing systems as described herein. Testing was conducted at a pipeline origination station having a tank farm housing various different types of crude oil and other hydrocarbon liquids. In a first blending operation run, two different types of crude were blended using a two-component in-line mixing system (e.g., having a gravity-fed stream containing a first fluid and a controlled feed stream containing a second fluid) with a target mix ratio of 50:50 (second fluid: first fluid). The two-component blending operation run was conducted for three hours with constant measurement of the actual percentage of the controlled feed stream being delivered in the total blended fluid flow (e.g., based on the measured flow rate of the crude oil in the controlled feed stream).

Table 1 includes data from the two-component blending operation run performed at the pipeline origination station. As shown in Table 1, the average actual percentage of the controlled feed stream was 49.87% over the duration of the three-hour two-component blending operation run based on a target set point ratio of 50:50 in the blended fluid flow. As indicated in Table 1, this represents a 0.13% linear difference and a 0.26% percent difference between the actual mix ratio and the target set point mix ratio. It should be noted that the percentage difference between the actual mix ratio and the target mix ratio would be expected to be even lower if the blending operation testing run were to be conducted for a longer duration (e.g., for 6 hours, or 9 hours, or 12 hours, or more).

TABLE 1

| Average Actual Percentage (%) | Target Percentage (%) | Linear Difference (%) | Percent Difference (%) |
|---|---|---|---|
| 49.8684% | 50% | 0.132% | −0.2632% |

In a separate blending operation run, three different types of crude oil were blended using a three-component in-line mixing system (e.g., having a gravity-fed stream containing a first fluid and two controlled feed streams containing a second fluid and a third fluid, respectively) with a target mix ratio of 50:46:4 (third fluid: second fluid: first fluid). The three-component blending operation run was conducted for six hours with constant measurement of the actual percentage of both controlled feed streams being delivered in the total blended fluid flow (e.g., based on the measured flow rate of the crude oil in each of the controlled feed streams).

Table 2 includes data from a blending operation run performed at a pipeline origination station using a three-component in-line mixing system according to the disclosure. As shown in Table 2, the average actual percentage of the third fluid was 49.95% over the duration of the six-hour three-component blending operation run based on a target set point ratio of 50:46:4 (third fluid: second fluid: first fluid) in the blended fluid flow. As indicated in Table 2, this represents a 0.05% linear difference and a 0.09% percent difference between the actual percentage of the third fluid and the target set point percentage of the third fluid. As also shown in Table 2, the average actual percentage of the second fluid was 49.89% over the duration of the six-hour three-component blending operation run based on a target set point ratio of 50:46:4 (third fluid: second fluid: first fluid) in the blended fluid flow. As indicated in Table 2, this represents a 0.11% linear difference and a 0.25% percent difference between the actual percentage of the second fluid and the target set point percentage of the second fluid. It should be noted that the percentage difference between the actual mix percentages and the target mix percentages would be expected to be even lower if the blending operation testing run were to be conducted for a longer duration (e.g., for 9 hours, 12 hours, 15 hours, or more).

TABLE 2

| Average Actual Percentage-Third Fluid (%) | Target Percentage- Third Fluid (%) | Linear Difference (%) | Percent Difference (%) |
|---|---|---|---|
| 49.9547% | 50% | 0.045% | −0.0906% |

| Average Actual Percentage-Second Fluid (%) | Target Percentage- Second Fluid (%) | Linear Difference (%) | Percent Difference (%) |
|---|---|---|---|
| 45.8859% | 46% | 0.114% | −0.2481% |

This application is a divisional of U.S. Non-Provisional application Ser. No. 17/226,610, filed Apr. 9, 2021, titled "METHODS AND SYSTEMS FOR INLINE MIXING OF HYDROCARBON LIQUIDS," now U.S. Pat. No. 11,132,008, issued Sep. 28, 2021, which is a continuation of U.S. Non-Provisional application Ser. No. 17/247,704, filed Dec. 21, 2020, titled "METHODS AND SYSTEMS FOR INLINE MIXING OF HYDROCARBON LIQUIDS," now U.S. Pat. No. 10,990,114, issued Apr. 27, 2021, which claims priority to, and the benefit of U.S. Provisional Application No. 62/954,960, filed Dec. 30, 2019, titled "METHOD AND APPARATUS FOR INLINE MIXING OF HEAVY CRUDE," U.S. Provisional 62/705,538, filed Jul. 2, 2020, titled "METHODS AND SYSTEMS FOR INLINE MIXING OF PETROLEUM LIQUIDS," and U.S. Provisional 63/198,356, filed Oct. 13, 2020, titled "METHODS AND SYSTEMS FOR INLINE MIXING OF PETROLEUM LIQUIDS," the disclosures of which are incorporated herein by reference in their entirety.

In the drawings and specification, several embodiments of systems and methods to provide in-line mixing of hydrocarbon liquids have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes may be made within the spirit and scope of the embodiments of systems and methods as described in the foregoing specification, and such modifications and changes are to be considered equivalents and part of this disclosure.

The invention claimed is:

1. An in-line fluid mixing system positioned at a tank farm to admix hydrocarbon liquids from a plurality of tanks into a single pipeline, the in-line fluid mixing system comprising:
   a first tank positioned in a tank farm and containing a first fluid therein;
   a first output pipe connected to the first tank proximate a bottom portion thereof, the first output pipe in fluid communication with the first fluid to transport a flow of the first fluid from the first tank through the first output pipe at a first pressure, the first pressure resulting from force of gravity on the first fluid;
   a second tank positioned in the tank farm and containing a second fluid therein;
   a second output pipe connected to the second tank proximate a bottom portion thereof, the second output pipe in fluid communication with the second fluid to transport a flow of the second fluid from the second tank through the second output pipe at a second pressure;
   a pump having an inlet and an outlet, the inlet of the pump connected to the second output pipe to increase pressure of the flow of the second fluid from the second pressure to a pump pressure at the outlet;
   a mixing pipe connected to the outlet of the pump to transport the flow of the second fluid therethrough;
   a blended fluid pipe connected to and in fluid communication with the first output pipe and the mixing pipe to admix the flow of first fluid at the first pressure and the flow of second fluid into a blended fluid flow; and
   a flow control valve connected to the mixing pipe and positioned between the pump and the mixing pipe to control flow of the second fluid between the pump and the mixing pipe.

2. The in-line fluid mixing system of claim 1, further comprising:
   a tank flow meter connected to the mixing pipe and positioned between the pump and the blended fluid pipe to measure flow rate of the flow of the second fluid between the pump and the blended fluid pipe; and
   a booster flow meter in fluid communication with the blended fluid pipe to measure total flow rate of the blended fluid flow transported through the blended fluid pipe.

3. The in-line fluid mixing system of claim 2, further comprising:
   one or more controllers in communication with the tank flow meter and the booster flow meter, the one or more controllers configured to:
      determine a ratio of the flow of second fluid to the flow of first fluid responsive to one or more signals received from the tank flow meter and the booster flow meter; and
   a variable speed drive, the variable speed drive connected to the pump to control pump speed to thereby adjust the flow of the second fluid through the pump and the one or more controllers configured to control the variable speed drive.

4. The in-line fluid mixing system of claim 3, wherein the one or more controllers are further configured to compare the ratio to a pre-selected set point ratio, to determine a modified flow of the second fluid to drive the ratio toward the pre-selected set point ratio, and to adjust the variable speed drive based on the determined modified flow of the second fluid.

5. The in-line fluid mixing system of claim 3, further comprising:
   a programmable logic controller in communication with the flow control valve and configured to control the flow control valve, and wherein the programmable logic controller governs the flow control valve to maintain pressure at the tank flow meter between about 15 psi and about 25 psi, and the one or more controllers further are configured to compare the ratio to a pre-selected set point ratio, to determine a modified flow of the second fluid to drive the ratio toward the pre-selected set point ratio, and to send a control signal to the programmable logic controller to adjust the flow control valve based on the determined modified flow of the second fluid.

6. The in-line fluid mixing system of claim 2, further comprising one or more controllers in communication with each of the tank flow meter and the booster flow meter to determine flow rate of the first fluid from the first tank responsive to signals received from the tank flow meter and the booster flow meter.

7. The in-line fluid mixing system of claim 1, wherein pressure of the second fluid is about equal to pressure of the first fluid at the portion of the blended fluid pipe configured to admix the flow of first fluid and the flow of second fluid into a blended fluid flow.

8. The in-line fluid mixing system of claim 1,
wherein an end portion of a recirculation pipe is connected to and in fluid communication with the mixing pipe downstream of the pump and another end portion of the recirculation pipe is connected to and in fluid communication with the second output pipe to recirculate the second fluid therethrough to maintain a minimum flow of second fluid through the pump, and
wherein a one-way valve is disposed in the recirculation pipe to prevent flow of the second fluid from the second output pipe to the mixing pipe.

9. The in-line fluid mixing system of claim 8, wherein the recirculation pipe is configured to permit flow therethrough only when a ratio of the flow of second fluid to the flow of first fluid falls below a pre-selected threshold.

10. An in-line fluid mixing system positioned at a tank farm to admix hydrocarbon liquids from a plurality of tanks into a single pipeline, the in-line fluid mixing system comprising:
a first tank containing a first fluid therein;
a first output pipe connected to the first tank proximate a bottom portion thereof, the first output pipe to transport a flow of the first fluid from the first tank at a first pressure therethrough, the first pressure resulting from force of gravity on the first fluid;
a second tank containing a second fluid therein;
a second output pipe connected to the second tank proximate a bottom portion thereof, the second output pipe to transport a flow of the second fluid from the second tank at a second pressure therethrough;
a third tank containing a third fluid therein;
a third output pipe connected to the third tank proximate a bottom portion thereof, the third output pipe to transport a flow of the third fluid from the third tank at a third pressure therethrough;
a second tank pump connected to the second output pipe to increase pressure of the flow of the second fluid from the second pressure to a second pump pressure at an outlet of the second tank pump;
a second tank mixing pipe connected to the outlet of the second tank pump to transport the flow of the second fluid therethrough;
a third tank pump connected to the third output pipe to increase pressure of the flow of the third fluid from the third pressure to a third pump pressure at an outlet of the third tank pump;
a third tank mixing pipe connected to the outlet of the third tank pump to transport the flow of the third fluid therethrough;
a blended fluid pipe connected to and in fluid communication with the first output pipe, the second tank mixing pipe, and the third tank mixing pipe to admix the flow of the first fluid at the first pressure, the flow of the second fluid, and the flow of the third fluid into a blended fluid flow;
a second tank flow meter connected to the second tank mixing pipe and to measure flow rate of the flow of the second fluid between the second tank pump and the blended fluid pipe;
a second tank flow control valve connected to the second tank mixing pipe between the second tank flow meter and the blended fluid pipe to control the flow of the second fluid between the second pump and the blended fluid pipe;
a third tank flow meter connected to the third tank mixing pipe and to measure flow rate of the flow of the third fluid between the third tank pump and the blended fluid pipe; and
a third tank flow control valve connected to the third tank mixing pipe between the third tank flow meter and the blended fluid pipe to control the flow of the third fluid between the third tank pump and the blended fluid pipe.

11. The in-line fluid mixing system of claim 10, further comprising:
a mixing flow meter connected to the blended fluid pipe to measure total flow rate of the blended fluid flow.

12. The in-line fluid mixing system of claim 11, further comprising:
one or more controllers in communication with the second tank flow meter, the third tank flow meter, and the mixing flow meter, the one or more controllers being configured to determine percentages of first fluid flow rate, second fluid flow rate, and third fluid flow rate in the total flow rate;
a second tank variable speed drive connected to the second tank pump to control pump speed of the second tank pump to thereby adjust flow of the second fluid through the second tank pump;
a third tank variable speed drive connected to the third tank pump to control pump speed of the third tank pump to thereby adjust flow of the third fluid through the third tank pump; and
a programmable logic controller in communication with:
the second tank variable speed drive and the third tank variable speed drive and configured to control the second tank variable speed drive and the third tank variable speed drive, and
the second tank flow control valve and the third tank flow control valve and configured to control the second tank flow control valve and the third tank flow control valve, wherein the programmable logic controller governs the flow control valve to maintain pressure at the tank flow meter between about 15 psi and about 25 psi.

13. The in-line fluid mixing system of claim 12, wherein the one or more controllers further are configured to compare the percentages to pre-selected percentages, to determine modified flows of the second and third fluids to drive the percentages toward the pre-selected percentages, and to send a control signal to the programmable logic controller to adjust at least one of the second tank variable speed drive or the third tank variable speed drive based on the determined modified flows of the second and third fluids.

14. The in-line fluid mixing system of claim 13, wherein the one or more controllers further are configured to compare the percentages to pre-selected percentages, to determine modified flows of the second and third fluids to drive the percentages toward the pre-selected percentages, and to send a control signal to the programmable logic controller to adjust at least one of the second tank flow control valve or the third tank flow control valve based on the determined modified flows of the second and third fluids.

15. The in-line fluid mixing system of claim 10, further comprising one or more controllers in communication with each of the second tank flow meter, the third tank flow meter, and the mixing flow meter, the one or more controller configured to determine flow rate of the first fluid from the first tank responsive to signals received from the second tank flow meter, the third tank flow meter, and the mixing flow meter.

16. The in-line fluid mixing system of claim 10, wherein an end portion of a second tank recirculation pipe is connected to and in fluid communication with the second tank blended fluid pipe downstream of the second tank pump and another end portion of the second tank recirculation pipe is connected to and in fluid communication with the second output pipe to recirculate the second fluid therethrough to maintain a minimum flow of second fluid through the second tank pump.

17. The in-line fluid mixing system of claim 16, further comprising a one-way valve disposed in the second tank recirculation pipe to prevent flow of the second fluid from the second output pipe to the second tank mixing pipe.

18. The in-line fluid mixing system of claim 10, wherein an end portion of a third tank recirculation pipe is connected to and in fluid communication with the third tank mixing pipe downstream of the third tank pump and another end portion of the third tank recirculation pipe is connected to and in fluid communication with the third output pipe to recirculate the third fluid therethrough to maintain a minimum flow of third fluid through the third tank pump.

19. The in-line fluid mixing system of claim 18, further comprising a one-way valve disposed in the third tank recirculation pipe to prevent flow of the third fluid from the third output pipe to the third tank mixing pipe.

20. An in-line fluid mixing system to admix hydrocarbon liquids from a plurality of tanks into a single pipeline, the in-line fluid mixing system comprising:
   a first tank containing a first fluid therein;
   a first output pipe connected to the first tank proximate a bottom portion thereof, the first output pipe in fluid communication with the first fluid to transport a flow of the first fluid from the first tank through the first output pipe at a first pressure, the first pressure resulting from force of gravity on the first fluid;
   a second tank containing a second fluid therein;
   a second output pipe connected to the second tank proximate a bottom portion thereof, the second output pipe in fluid communication with the second fluid to transport a flow of the second fluid from the second tank through the second output pipe at a second pressure;
   a pump having an inlet and an outlet, the inlet of the pump connected to the second output pipe to increase pressure of the flow of the second fluid from the second pressure to a pump pressure at the outlet;
   a mixing pipe connected to the outlet of the pump to transport the flow of the second fluid therethrough;
   a blended fluid pipe connected to and in fluid communication with the first output pipe and the mixing pipe to admix the flow of first fluid at the first pressure and the flow of second fluid into a blended fluid flow; and
   a flow control valve connected to the mixing pipe and positioned between the pump and the mixing pipe to control flow of the second fluid between the pump and the mixing pipe.

21. The in-line fluid mixing system of claim 20, further comprising:
   a tank flow meter connected to the mixing pipe and positioned between the pump and the blended fluid pipe to measure flow rate of the flow of the second fluid between the pump and the blended fluid pipe; and
   a booster flow meter in fluid communication with the blended fluid pipe to measure total flow rate of the blended fluid flow transported through the blended fluid pipe.

22. The in-line fluid mixing system of claim 21, further comprising:
   one or more controllers in communication with the tank flow meter and the booster flow meter, the one or more controllers configured to:
   determine a ratio of the flow of second fluid to the flow of first fluid responsive to one or more signals received from the tank flow meter and the booster flow meter; and
   a variable speed drive, the variable speed drive connected to the pump to control pump speed to thereby adjust the flow of the second fluid through the pump and the one or more controllers configured to control the variable speed drive.

23. The in-line fluid mixing system of claim 22, wherein the one or more controllers are further configured to compare the ratio to a pre-selected set point ratio, to determine a modified flow of the second fluid to drive the ratio toward the pre-selected set point ratio, and to adjust the variable speed drive based on the determined modified flow of the second fluid.

24. The in-line fluid mixing system of claim 22, further comprising:
   a programmable logic controller in communication with the flow control valve and configured to control the flow control valve, and wherein the programmable logic controller governs the flow control valve to maintain pressure at the tank flow meter between about 15 psi and about 25 psi, and
   the one or more controllers further are configured to compare the ratio to a pre-selected set point ratio, to determine a modified flow of the second fluid to drive the ratio toward the pre-selected set point ratio, and to send a control signal to the programmable logic controller to adjust the flow control valve based on the determined modified flow of the second fluid.

25. The in-line fluid mixing system of claim 21, further comprising one or more controllers in communication with each of the tank flow meter and the booster flow meter to determine flow rate of the first fluid from the first tank responsive to signals received from the tank flow meter and the booster flow meter.

26. An in-line fluid mixing system to admix hydrocarbon liquids from a plurality of tanks into a single pipeline, the in-line fluid mixing system comprising:

one or more first tanks each containing a first fluid therein;

one or more first output pipes connected to the one or more first tanks and in fluid communication with the first fluid to transport a flow of the first fluid from the one or more first tanks through the one or more first output pipes at a first pressure, the first pressure resulting from force of gravity on the first fluid;

one or more second tanks each containing a second fluid therein;

one or more second output pipes connected to the one or more second tanks proximate a bottom portion thereof, the one or more second output pipes in fluid communication with the second fluid to transport a flow of the second fluid from the one or more second tanks through the one or more second output pipes at a second pressure;

one or more pumps each having an inlet and an outlet, the inlet of each of the one or more pumps connected to the one or more second output pipes to increase pressure of the flow of the second fluid from the second pressure to a pump pressure at the outlet;

one or more mixing pipes connected to the outlet of the one or more pumps to transport the flow of the second fluid therethrough;

one or more blended fluid pipes connected to and in fluid communication with the one or more first output pipes and the one or more mixing pipes to admix the flow of first fluid at the first pressure and the flow of second fluid into a blended fluid flow;

one or more flow control valves connected to the one or more mixing pipes and positioned between the one or more pumps and the one or more mixing pipes to control flow of the second fluid between the one or more pumps and the one or more mixing pipes.

27. The in-line fluid mixing system of claim 26, wherein pressure of the second fluid is about equal to pressure of the first fluid at the portion of the one or more blended fluid pipes configured to admix the flow of first fluid and the flow of second fluid into a blended fluid flow.

28. The in-line fluid mixing system of claim 26, wherein an end portion of one or more recirculation pipes is connected to and in fluid communication with the one or more mixing pipes downstream of the one or more pumps, and another end portion of the one or more recirculation pipes is connected to and in fluid communication with the one or more second output pipes to recirculate the second fluid therethrough to maintain a minimum flow of second fluid through the one or more pumps, and wherein one or more one-way valves is disposed in the one or more recirculation pipes to prevent flow of the second fluid from the one or more second output pipes to the one or more mixing pipes.

29. The in-line fluid mixing system of claim 28, wherein the one or more recirculation pipes is configured to permit flow therethrough only when a ratio of the flow of second fluid to the flow of first fluid falls below a pre-selected threshold.

30. The in-line fluid mixing system of claim 26, further comprising:

one or more tank flow meters connected to the one or more mixing pipes and positioned between the one or more pumps and the one or more blended fluid pipes to measure flow rate of the flow of fluid between the one or more pumps and the one or more blended fluid pipes;

one or more booster flow meters in fluid communication with the one or more blended fluid pipes to measure total flow rate of the blended fluid flow transported through the one or more blended fluid pipes; and one or more controllers in communication with each of the one or more tank flow meters and the one or more booster flow meters to determine flow rate of the first fluid from the oene or more first tanks responsive to signals received from the one or more tank flow meters and the one or more booster flow meters.

\* \* \* \* \*